US011985101B2

(12) United States Patent
Shulman et al.

(10) Patent No.: US 11,985,101 B2
(45) Date of Patent: May 14, 2024

(54) METHOD, APPARATUS, ELECTRONIC MESSAGE SERVER AND COMPUTER PROGRAM FOR PROCESSING A PLURALITY OF ELECTRONIC MESSAGES

(71) Applicant: Fraunhofer-Gesellschaft zur Foerderung der angewandten Forschung e. V., Munich (DE)

(72) Inventors: Haya Shulman, Darmstadt (DE); Kevin Freeman, Darmstadt (DE); Markus Schneider, Darmstadt (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/251,132

(22) Filed: Jan. 18, 2019

(65) Prior Publication Data
US 2020/0236079 A1 Jul. 23, 2020

(51) Int. Cl.
*H04L 51/212* (2022.01)
*H04L 9/40* (2022.01)

(52) U.S. Cl.
CPC ........ *H04L 51/212* (2022.05); *H04L 63/0236* (2013.01); *H04L 63/0281* (2013.01); *H04L 63/1425* (2013.01)

(58) Field of Classification Search
CPC .......... H04L 51/12; H04L 51/22; G06Q 10/10
See application file for complete search history.

(56) References Cited

U.S. PATENT DOCUMENTS 9,571,435 B2   2/2017  Lu et al.
9,847,973 B1 * 12/2017 Jakobsson ........... H04L 63/0245
(Continued)

FOREIGN PATENT DOCUMENTS

EP     1635524 A1    3/2006

OTHER PUBLICATIONS

"How to derail a Business Gmail spam bomb", Teksecurityblog.com, Feb. 11, 2016 [retrieved on Aug. 13, 2022]. Retrieved from the Internet: <URL: https://teksecurityblog.com/how-to-derail-a-business-gmail-spam-bomb/>. (Year: 2016).*
(Continued)

*Primary Examiner* — Kevin T Bates
*Assistant Examiner* — Dae Kim
(74) *Attorney, Agent, or Firm* — 2 SPL Patent Attorneys PartG mbB; Yong Beom Hwang

(57) ABSTRACT

Examples relate to a method, an apparatus and a computer program for processing a plurality of electronic messages, and to an electronic message server. The method comprises obtaining (110) the plurality of electronic messages. The method further comprises selecting (120) at least a subset of electronic messages of the plurality of electronic messages based on information related to a plurality of suspicious electronic message sender identifiers. The method further comprises determining (130), whether a number of electronic messages of the subset of electronic messages obtained within a pre-defined time interval exceeds a threshold. The method further comprises discarding (140) the electronic messages of the subset of electronic messages if the number of electronic messages of the subset of electronic messages obtained within the pre-defined time interval exceeds the threshold.

13 Claims, 11 Drawing Sheets

(56) References Cited

U.S. PATENT DOCUMENTS

| | | | |
|---|---|---|---|
| 2005/0060643 A1* | 3/2005 | Glass | G06F 40/169 |
| | | | 715/205 |
| 2006/0031306 A1* | 2/2006 | Haverkos | H04L 51/12 |
| | | | 709/206 |
| 2006/0075048 A1* | 4/2006 | Gruper | H04L 51/12 |
| | | | 709/206 |
| 2006/0168033 A1* | 7/2006 | Cai | G06Q 10/107 |
| | | | 709/206 |
| 2007/0088789 A1* | 4/2007 | Berman | G06Q 10/00 |
| | | | 709/206 |
| 2008/0114843 A1* | 5/2008 | Shinde | G06Q 10/107 |
| | | | 709/206 |
| 2008/0140781 A1* | 6/2008 | Bocharov | G06Q 10/107 |
| | | | 709/206 |
| 2014/0052791 A1 | 2/2014 | Chakra et al. | |
| 2016/0072749 A1* | 3/2016 | Lu | H04L 51/12 |
| | | | 709/206 |

OTHER PUBLICATIONS

Taiki Takashita et al.: A Spam Filtering Method Learning from Web Browsing Behavior; Knowledge-Based Intelligent Information and Engineering Systems; [Lecture Notes in Computer Science], Springer Berlin Heidelberg, Berlin, Heidelberg, pp. 774-781, XP019103620, ISBN: 978-3-540-85564-4; Sep. 3, 2008 (Sep. 3, 2008).

* cited by examiner

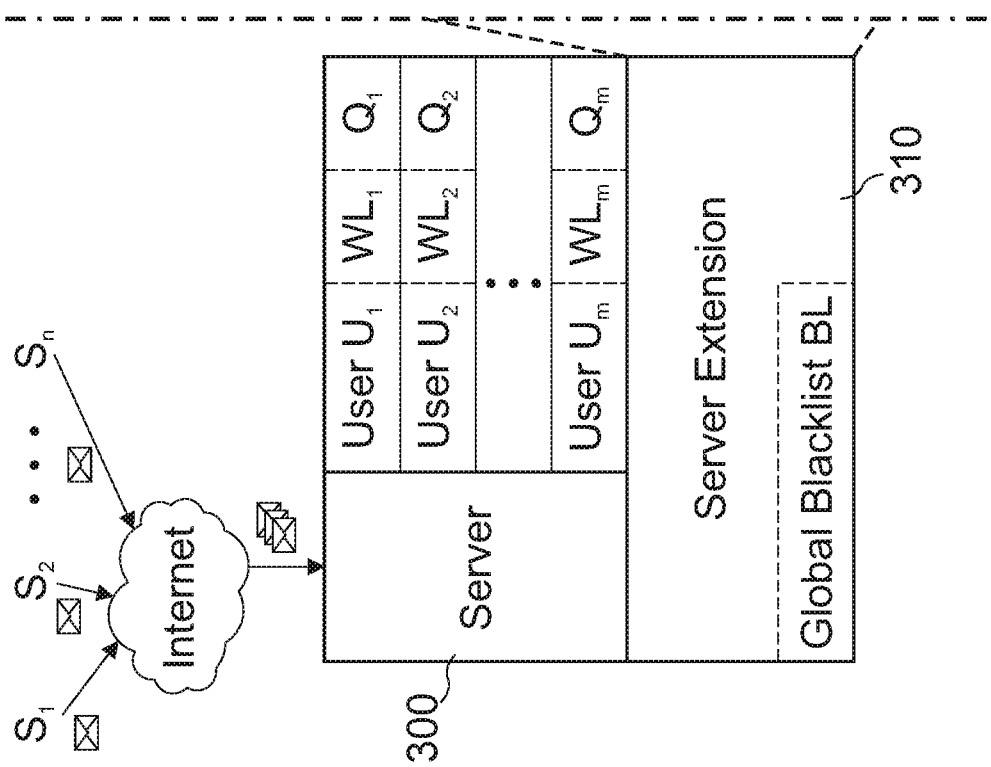

ମETHOD, APPARATUS, ELECTRONIC MESSAGE SERVER AND COMPUTER PROGRAM FOR PROCESSING A PLURALITY OF ELECTRONIC MESSAGES

FIELD

Examples relate to a method, an apparatus and a computer program for processing a plurality of electronic messages, and to an electronic message server, e.g. an e-mail server, comprising the apparatus and/or executing the method or computer program. Examples further relate to a method, and apparatus and a computer program for providing information related to a web browsing history, and to a web proxy server or a web browser extension comprising the apparatus or executing the method or computer program.

BACKGROUND

Spam emails are an old and severe problem for companies, governments, and citizens. Mostly all users suffer on the reception of unsolicited emails, and on their potential impact. Meanwhile, there are many solutions to filter out millions of spams each day and support users to keep their mail inboxes usable without additional workload. In general, spam emails can cause harm for their receivers. They range from disinformation over waste of resources (storage, transmission, human workload) up to becoming victims of attacks based thereon.

Products and services to fight email spam follow different approaches. There are approaches that become effective at an IP level, e.g., through applying blacklists with spammer addresses, or at the content level, e.g., through analyzing email bodies for typical keywords such as Viagra. They can also be differentiated to be applied at an ISP level close to the email source, at the receiver side on the user's email account, or somewhere in between. Such products may work well for their respective purpose.

In 2016, with email bombs a new type of spam email attack has been reported. In such an attack, the amount of spam emails for a recipient is this big that it implies a Distributed Denial of Service (DDoS) for the recipient. It has been executed against various government email boxes. This attack rendered the targeted inboxes useless for a period of time. The principle behind this attack is quite easy, but nevertheless very effective. For attack execution, the attacker registered a receiver's email address to a huge number of email notification services, such as newsletters. Since this registration can be automated with scripts, the respective inboxes have been flooded with thousands of emails. This is easily possible, since often newsletter subscription forms are not secured, e.g., with CAPTCHAs (Completely Automated Public Turing Test to Tell Computers and Humans Apart). Furthermore, many newsletter senders apply opt-out, i.e., they keep on sending newsletters until the receiver manually unsubscribes. Using junk folders as protection is not practical for these attacks since the number of emails is usually too big.

For victims this attack is very annoying. Existing spam protection methods are overchallenged to filter out a newsletter that has been subscribed for the victim by an attacker. The challenge for a protection method may be to decide whether a newsletter is sent upon the receiver's own initiative or upon a hacker's initiative in an email bomb attack, or more generally, in a message bomb attack. Since a newsletter sent upon subscription cannot be classified as spam, we refer to this type of spam it as pseudo-spam, herein.

Today, there may be several offers in the darknet for initiating such e-mail bomb attacks: For only a few US-$ (e.g., 5 US-$), such attacks comprising many thousand senders for a receiver address may be commissioned.

SUMMARY

Embodiments are based on the finding that a specific type of spam messages, in the following denoted "pseudo-spam messages", comprise electronic messages that are virtually indistinguishable from messages that a user desires to receive. Message bomb attacks or email bomb attacks may be carried out against specific persons in companies and single citizens. The problem is that both email content and sender may be exactly identical in the case of intentional subscription and in the case of subscription by hackers. The challenge for a protection method may be to decide whether a newsletter is sent upon the receiver's own initiative or an attacker's initiative. These pseudo-spam messages often originate from a specific type of malicious attack, in which the message address (e.g. an e-mail address) is automatically subscribed to a multitude of message distribution lists, such as e.g. newsletters. If the amount of message distribution lists the user is (maliciously) subscribed to is high enough, the amount of messages originating from the multitude of message distribution lists may either fill up the user's inbox until they exceed the user's quota, or, if the user has an inbox with unlimited storage space, the maliciously received messages may bury regular messages, leaving the user with the herculean task of sorting the regular messages from the maliciously received messages. Embodiments are based on the finding that such malicious messages are often received within a short period of time, e.g. a short period of time after an attacker has started the malicious attack. Furthermore, the messages often originate from the same sources, e.g. such as message distribution lists without advanced user verification schemes or with known vulnerabilities. As this type of attack may rely on the attacker being able to automatically and programmatically add the user's message address to the multitude of message distribution lists, the same message distribution lists may be used in the a plurality of attacks, which may enable a generation of a blacklist, in which the suspicious message distribution lists (or their sender identifiers) are comprised. If a number of messages from sender identifiers on the blacklist that arrive within a pre-defined time interval exceeds a threshold, all messages received from said sender identifiers may be discarded (i.e. not delivered), thwarting or alleviating the message bomb attack.

Embodiments provide a method (e.g. a computer-implemented method) for processing a plurality of electronic messages. The plurality of electronic messages may be directed at (i.e. addressed to) a particular electronic message recipient, e.g. the same (single) user. The method comprises obtaining the plurality of electronic messages. The method further comprises selecting at least a subset of electronic messages of the plurality of electronic messages based on information related to a plurality of suspicious electronic message sender identifiers. The method further comprises determining, whether a number of electronic messages of the subset of electronic messages obtained within a pre-defined time interval exceeds a threshold. The method further comprises discarding the electronic messages of the subset of electronic messages if the number of electronic messages of the subset of electronic messages obtained within the pre-defined time interval exceeds the threshold. This may enable discarding of all or of the bulk of electronic messages that are caused by a message bomb attack.

For example, the plurality of electronic messages may be a plurality of e-mail messages. The subset of electronic messages may be electronic messages of e-mail notification services, such as e-mail newsletter messages. The method may be executed by an apparatus of an e-mail server. E-mail inboxes may be prone to such attacks, so the method may enable at least a partial protection against such attacks on e-mail inboxes.

In some embodiments, the method comprises delivering the electronic messages of the subset of electronic messages if the number of electronic messages of the subset of electronic messages obtained within the pre-defined time interval is at most the number defined by the threshold. If the number of electronic messages of the subset of electronic messages obtained within the pre-defined time interval does not exceed the threshold, the inbox of the user might not be under attack and/or the number of messages received might not be big enough to overwhelm the user.

In at least some embodiments, an electronic message of a plurality of electronic messages may be omitted from the subset of electronic messages if the plurality of unsuspicious electronic message sender identifiers comprises a sender identifier of the electronic message. The plurality of unsuspicious electronic message sender identifiers may constitute a whitelist of unsuspicious electronic message sender identifiers. The plurality of electronic messages may be directed at a particular electronic message recipient. The whitelist may be specific to said electronic message recipient.

In some embodiments, the plurality of electronic messages is directed at a particular electronic message recipient. The plurality of unsuspicious electronic message sender identifiers may comprise a first subset of unsuspicious electronic message sender identifiers that is based on previously obtained electronic messages, and a second subset of unsuspicious electronic message sender identifiers that is based on a web browsing history of a user associated with the electronic message recipient. This may enable a construction of a whitelist that is based both on previously received messages and based on a web-browsing history of the user.

For example, the method may comprise adding one of more electronic message sender identifiers of the subset of electronic messages to a plurality of unsuspicious electronic message sender identifiers if the number of electronic messages of the subset of electronic messages obtained within the pre-defined time interval is at most the number defined by the threshold. This may add sender identifiers of electronic messages that are desired by the users to a whitelist, e.g. to enable delivery of such messages in case of a message bomb attack.

Additionally or alternatively, the method may further comprise obtaining information related to the web browsing history of the user associated with the electronic message recipient. The method may comprise determining at least a part of the plurality of unsuspicious electronic message sender identifiers based on the information related to the web browsing history of the user associated with the electronic message recipient. Optionally, the information related to the web browsing history may be obtained from a web proxy server or from a web browser extension. This may enable a construction of the whitelist without user intervention.

The method may further comprise delivering the electronic messages of the plurality of electronic messages that are omitted from the subset of electronic messages. This may enable a delivery of unsuspicious messages, enabling a reception of electronic messages (without delay) even in case of a message bomb attack.

In at least some embodiments, the pre-defined time interval is defined relative to a current time or relative to a time of an event. The subset of electronic messages may be continually updated based on the pre-defined time interval that is defined relative the current time or relative to the time of the event. This may enable a continuous protection against message bomb attacks.

For example, a duration of the time interval may be at most 10 minutes. The threshold may be at least 20 electronic messages. This may provide a protection against typical message bomb attacks.

Embodiments further provide a method for providing information related to a web browsing history. The method comprises determining one or more web sites that are accessed by a user, wherein the user is associated with an electronic message recipient. The method comprises determining the information related to the web browsing history of the user associated with the electronic message recipient based on the determined one or more web sites. The method comprises providing the information related to the web browsing history to an e-mail server. The information related to the web browsing history is provided to the e-mail server to enable a determination of a whitelist of unsuspicious electronic message sender identifiers (or of a plurality of unsuspicious electronic message identifiers) based on the information related to the web browsing history. For example, the method may be implemented or executed by a web proxy server. Alternatively, the method may be implemented or executed by a web browser extension. This may enable a construction of the whitelist without user intervention.

Embodiments further provide a computer program having a program code for performing the method according to embodiments, when the computer program is executed on a computer, a processor, or a programmable hardware component.

Embodiments further provide an apparatus for processing a plurality of electronic messages. The apparatus comprises an interface for obtaining the plurality of electronic messages. The apparatus comprises a control module configured to obtain the plurality of electronic messages via the interface. The control module is configured to select at least a subset of electronic messages of the plurality of electronic messages based on information related to a plurality of suspicious electronic message sender identifiers. The control module is configured to determine whether a number of electronic messages of the subset of electronic messages obtained within a pre-defined time interval exceeds a threshold. The control module is configured to discard the electronic messages of the subset of electronic messages if the number of electronic messages of the subset of electronic messages obtained within the pre-defined time interval exceeds the threshold. Embodiments further provide an electronic message server comprising the apparatus.

Embodiments further provide an apparatus for providing information related to a web browsing history. The apparatus comprises at least one interface for communicating with an e-mail server. The apparatus comprises a control module configured to determine one or more web sites that are accessed by a user. The user is associated with an electronic message recipient. The control module is configured to determine the information related to the web browsing history of the user associated with the electronic message recipient based on the determined one or more web sites.

The control module is configured to provide the information related to the web browsing history to an e-mail server. The information related to the web browsing history is provided to the e-mail server to enable a determination of a whitelist of unsuspicious electronic message sender identifiers based on the information related to the web browsing hi story.

Embodiments further provide a system comprising both apparatuses, e.g. comprising an electronic message with the apparatus for processing a plurality of electronic messages and a web proxy server or a web browser extension comprising the apparatus for providing information related to a web browsing history.

BRIEF DESCRIPTION OF THE FIGURES

Some examples of apparatuses and/or methods will be described in the following by way of example only, and with reference to the accompanying figures, in which

FIG. 3-1 and FIG. 3-2 combine to form FIG. 3 which shows a schematic diagram of an approach for processing a plurality of electronic messages;

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality.

Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
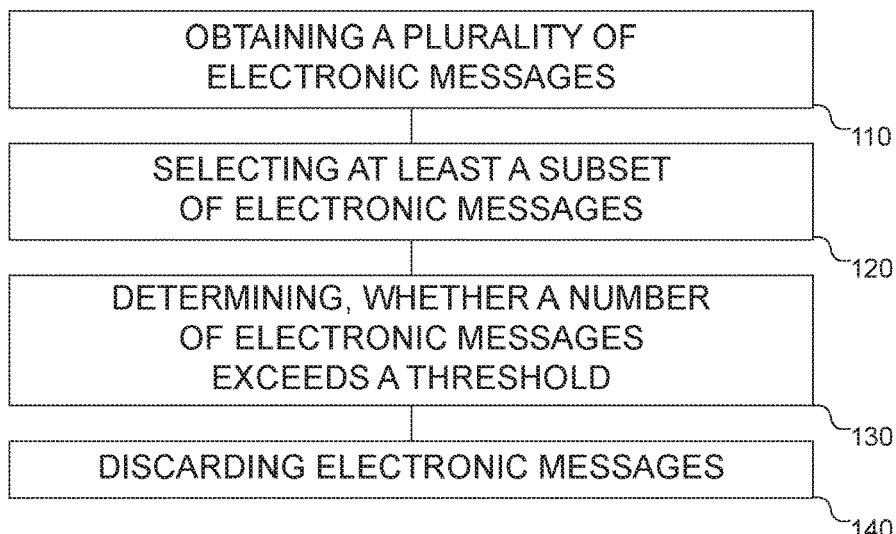
FIGS. 1a and 1b show flow charts of embodiments of a method for processing a plurality of electronic messages.
Figure 1B:
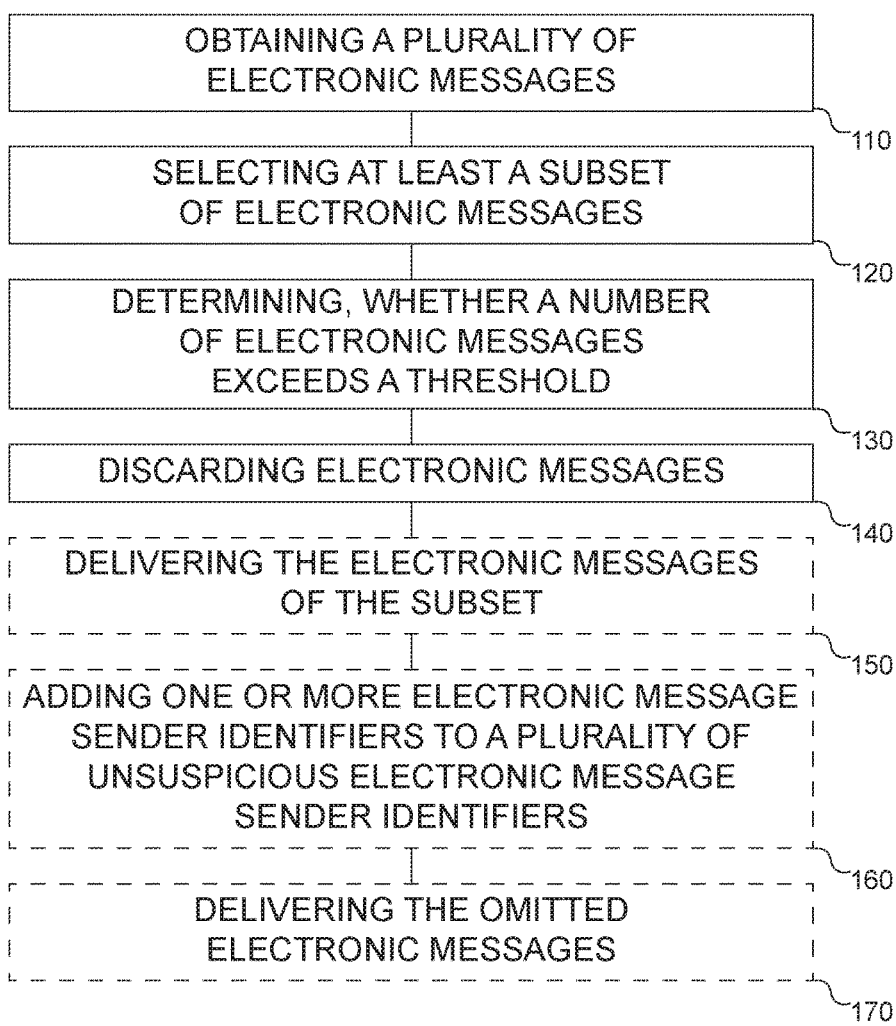

FIGS. 1a and 1b show flow charts of embodiments of a method (e.g. of a computer-implemented method) for processing a plurality of electronic messages. The method comprises obtaining 110 the plurality of electronic messages within a pre-defined time interval. The method further comprises selecting 120 at least a subset of electronic messages of the plurality of electronic messages based on information related to a plurality of suspicious electronic message sender identifiers. The method further comprises determining 130, whether a number of electronic messages of the subset of electronic messages obtained within a pre-defined time interval exceeds a threshold. The method further comprises discarding 140 the electronic messages of the subset of electronic messages if the number of electronic messages of the subset of electronic messages obtained within the pre-defined time interval exceeds the threshold.

Figure 1C:
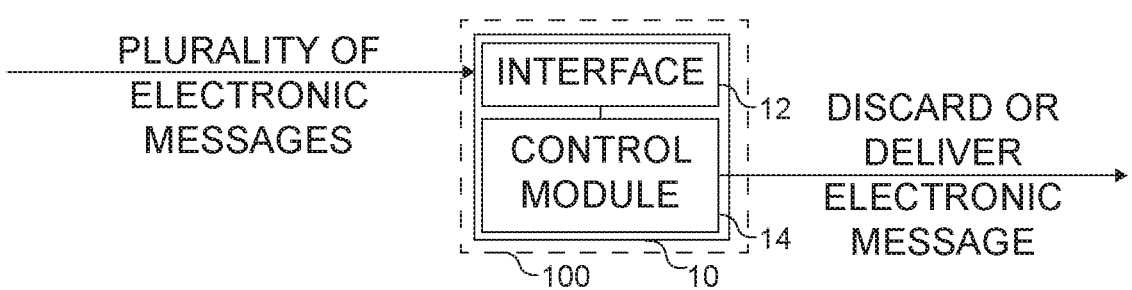
FIG. 1c shows a block diagram of an embodiment of an apparatus for processing a plurality of electronic messages.

FIG. 1c shows a block diagram of an embodiment of an (corresponding) apparatus 10 for processing a plurality of electronic messages. The apparatus comprises an interface 12 for obtaining the plurality of electronic messages. The apparatus comprises a control module 14 that is coupled to the interface 12. The apparatus may further comprise a storage module for storing information, which may be coupled to the control module 14. The control module 14 may be configured to execute the method introduced in connection with FIGS. 1a and/or 1b, e.g. in conjunction with the interface 12 and the storage module. In other words, the method may be executed by an apparatus 10 of an electronic message server 100, e.g. of an e-mail server. For example, the control module 14 is configured to obtain the plurality of electronic messages within a pre-defined time interval via the interface 12. The control module 14 is configured to select at least a subset of electronic messages of the plurality of electronic messages based on information related to a plurality of suspicious electronic message sender identifiers. The control module 14 is configured to determine, whether a number of electronic messages of the subset of electronic messages obtained within the pre-defined time interval exceeds a threshold. The control module is configured to discard the electronic messages of the subset of electronic messages if the number of electronic messages of the subset of electronic messages obtained within the pre-defined time interval exceeds the threshold. FIG. 1c further shows an electronic message server 100, e.g. an e-mail server 100, comprising the apparatus 10. The apparatus 10 may be a (software) module, (software) extension or (software) plugin of/for the electronic message server 100. In at least some embodiments, the electronic message server may be a server for sending and receiving electronic messages, which may host a plurality of electronic message stores (i.e. folders, such as an inbox) for a plurality of different users.

The following description relates to both the method of FIGS. 1a and/or 1b and the apparatus 10 or electronic message server 100 of FIG. 1c.

The method comprises obtaining 110 (i.e. receiving) a plurality of electronic messages. For example, the plurality of electronic messages are a plurality of e-mail messages that are received by an e-mail server. Alternatively, the plurality of electronic messages may be a plurality of direct messages of a social media platform, or a plurality of electronic messages of an internet-based messaging protocol. In some cases, the plurality of electronic messages may be a plurality of text messages of a cellular mobile communication system. The plurality of electronic messages may be directed at a particular electronic message recipient, e.g. addressed to a particular (single) destination identifier, i.e. the same e-mail address, social media handle or telephone number. Each of the plurality of electronic messages may be directed at or addressed to the same destination identifier. For example, the plurality of electronic messages may be obtained (i.e. received) via a communication network, e.g. via a mobile communication system and/or via the internet. In at least some embodiments, the plurality of electronic messages are received within the pre-defined time interval.

The method further comprises selecting 120 at least a subset of electronic messages of the plurality of electronic messages. The subset of electronic messages may comprise electronic messages of the plurality of electronic messages that comprise or originate from suspicious electronic message sender identifiers. In this case, contrary to other spam detection approaches, the suspicious electronic message sender identifiers might not refer to Internet Protocol (IP) addresses, but to sender e-mail addresses, sender telephone numbers or sender social media handles. The subset of electronic messages may comprise or be electronic messages of e-mail notification services, such as e-mail newsletter messages. As such electronic messages may either be requested by the electronic message recipient him/herself or by the attacker, the selecting 120 of the subset of electronic messages may select electronic messages, for which it is dubious as to whether they are obtained at a request of an attacker or at a request of the electronic message recipient.

The subset of electronic messages is selected 120 based on the information related to a plurality of suspicious electronic message sender identifiers. The method may comprise storing the information related to the plurality of suspicious electronic message sender identifiers within the storage module. The information related to the plurality of suspicious electronic message sender identifiers may comprise or constitute a blacklist of suspicious electronic message sender identifiers, e.g. a blacklist of suspicious e-mail addresses, of suspicious e-mail domains, of suspicious social media handles or of suspicious telephone numbers. For example, the blacklist may be a global blacklist, i.e. a blacklist that is used for (all) users of the electronic message server 100. The plurality of suspicious electronic message sender identifiers might (only) comprise electronic message sender identifiers of electronic message senders that have previously transmitted suspicious electronic messages, e.g. electronic message sender identifiers that are associated with previous message bomb attacks. Suspicious electronic message sender identifiers may refer to electronic message sender identifiers may refer to electronic message sender identifiers that have been previously used for message bomb attacks. An electronic message of the plurality of electronic messages may be selected for the subset of electronic messages if an electronic message sender identifier (i.e. e-mail address, social media handle, or telephone number) of the electronic message is comprised in the plurality of suspicious electronic message sender identifiers.

For example, the method may further comprise obtaining the information related to the plurality of suspicious electronic message sender identifiers from a server, e.g. from a provider of information related to the plurality of suspicious electronic message sender identifiers. The information related to the plurality of suspicious electronic message sender identifiers may be determined using a honey pot, e.g. using e-mail addresses that are purposefully attacked using a message bomb attack. Consequently, embodiments further provide a method for providing the information related to the plurality of suspicious electronic message sender identifiers, wherein the method comprises determining the information related to the plurality of suspicious electronic message sender identifiers using a honeypot, and providing the information related to the plurality of suspicious electronic message sender identifiers to an apparatus of an electronic message server, e.g. to the apparatus 10.

If an electronic message of the plurality of electronic messages is not selected for the subset of electronic messages, e.g. because its electronic message sender identifier is absent from the plurality of suspicious electronic message sender identifiers, it may be delivered, i.e. stored within an inbox of the electronic message recipient. In other words, the method may comprise delivering 170 the electronic messages of the plurality of electronic messages that are omitted from the subset of electronic messages.

In order to determine, whether there is an ongoing message bomb attack directed at the electronic message recipient, the method comprises determining 130, whether the number of electronic messages of the subset of electronic messages obtained within the pre-defined time interval exceeds the threshold. In at least some embodiments, the pre-defined time interval is a continually moving pre-defined time interval, i.e. the pre-defined time interval may be relative to a point in time at which the determining 130 whether the number of electronic messages of the subset of electronic messages obtained within the pre-defined time interval exceeds the threshold is performed. In other words, the pre-defined time may be defined relative to a current time or relative to a time of an event. For example, the event may be an execution of a function of the electronic message server or of a feature of the method, a fixed point in time, or a runtime of a script. The current time may be continuously updated. For example, the pre-defined time interval may be the last n (for n=1 . . . 10) minutes before the determining 130 whether the number of electronic messages of the subset of electronic messages obtained within the pre-defined time interval exceeds the threshold is performed. The selecting 120 of the subset of electronic messages and/or the determining 130, whether the number of electronic messages of the subset of electronic messages obtained within the pre-defined time interval exceeds the threshold may be continuously updated. For example, the selecting 120 of the subset of electronic messages and the determining 130, whether the number of electronic messages of the subset of electronic messages obtained within the pre-defined time interval exceeds the threshold may be periodically repeated, e.g. every 10 s or every minute.

The pre-defined time-interval may be set relative to the time that the selecting 120 of the subset of electronic messages and the determining 130, whether the number of electronic messages of the subset of electronic messages obtained within the pre-defined time interval exceeds the threshold are performed. For example, the subset of electronic messages is continually updated based on the continually moving pre-defined time interval, i.e. newly obtained electronic messages obtained within the continuously moving pre-defined time interval may be added to the subset of electronic messages and electronic messages of the subset of electronic messages that fall outside the scope of the pre-defined time interval may be removed from the subset of electronic messages. In other words, the subset of electronic messages is continually updated based on the pre-defined time interval that is defined relative to the current time or relative to the time of the event. The electronic messages that are selected for the subset of electronic messages may be delayed during the pre-defined time interval. In other words, the method may comprise delaying a delivery of electronic messages that are selected for the subset of electronic messages for a duration of the time-interval. The method may comprise storing (i.e. enqueuing) the subset of electronic messages) for the duration of the time-interval.

In at least some embodiments, a duration of the time interval may be at most 10 minutes (or at most 8 minutes, at most 5 minutes, at most 3 minutes, at most 2 minutes, at most 1 minute) and/or at least 1 minute (or at least 2 minutes, at least 3 minutes, at least 4 minutes, at least 5 minutes). The threshold may be at least 10 electronic messages (or at least 15 electronic messages, at least 20 electronic messages, at least 30 electronic messages, at least 50 electronic messages, at least 80 electronic messages, at least 100 electronic messages) and/or at most 500 electronic messages (or at most 300 electronic messages, at most 200 electronic messages, at most 100 electronic messages, at most 80 electronic messages, at most 50 electronic messages.

The method further comprises discarding (i.e. not delivering) 140 (all of) the electronic messages of the subset of electronic messages if the number of electronic messages of the subset of electronic messages obtained within the pre-defined time interval exceeds the threshold. If the threshold is not exceeded, the electronic messages of the subset of electronic messages may be delivered. In other words, as shown in FIG. 1b, the method may comprise delivering 150 (all of) the electronic messages of the subset of electronic messages if the number of electronic messages of the subset of electronic messages obtained within the pre-defined time interval is at most the number defined by the threshold. The electronic messages of the subset of electronic messages may be delivered individually after the pre-defined time interval has passed for the individual electronic messages. In other words, an electronic message of the subset of electronic messages may be delivered 150 after the pre-defined time interval, i.e. if a time that has passed between obtaining the electronic message and a current time corresponds to or surpasses the pre-defined time (and if the number of electronic messages of the subset of electronic messages obtained within the pre-defined time interval is at most the number defined by the threshold). Alternatively, all of the electronic messages of the subset of electronic messages may be delivered at once, e.g. if the pre-defined time interval is defined relative to an event, such as a fixed point in time. For example, in a trivial implementation, the time-interval may be 5 minutes long, and may be defined relative to fixed points in time that occur every 5 minutes, e.g. based on a script that is executed every 5 minutes.

Furthermore, the method may be self-learning. If the electronic message recipient desires to receive electronic messages that originate from an electronic message sender (i.e. an e-mail address, a social media handle or a phone number) that is comprised in the plurality of suspicious electronic message senders, the electronic message sender identifier of said electronic message sender may be added to a whitelist of electronic message sender identifiers. In other words, as further shown in FIG. 1b, the method may comprise adding 160 one of more electronic message sender identifiers of the subset of electronic messages to a plurality of unsuspicious electronic message sender identifiers if the number of electronic messages of the subset of electronic messages obtained within the pre-defined time interval is at most the number defined by the threshold. The method may comprise storing the plurality of unsuspicious electronic message sender identifiers within the storage module. For example, the plurality of unsuspicious electronic message sender identifiers may constitute a whitelist of unsuspicious electronic message sender identifiers. The whitelist may be electronic message recipient-specific. In other words, the plurality of electronic messages may be directed at a particular electronic message recipient. The whitelist may be specific to said electronic message recipient.

In at least some embodiments, the plurality of unsuspicious electronic message sender identifiers (i.e. the whitelist) may be controlled by the apparatus 10 or the e-mail server comprising the apparatus 10. Alternatively, the plurality of unsuspicious electronic message sender identifiers (i.e. the whitelist) may be controlled by a browser extension or by a web proxy server. The method may further comprise providing an administrative interface for controlling the plurality of unsuspicious electronic message sender identifiers (i.e. the whitelist). The administrative interface for controlling the plurality of unsuspicious electronic message sender identifiers (i.e. the whitelist) may be provided by one or more elements of the apparatus 10, the e-mail server, the apparatus 20, the web proxy server and the web browser extension.

In at least some embodiments, the plurality of unsuspicious electronic message sender identifiers (e.g. the whitelist) might (also) comprise electronic message sender identifiers that originate from a different source, e.g. which may be based on a previous web browsing of a user associated with the electronic message recipient. For example, the plurality of unsuspicious electronic message sender identifiers may comprise a first subset of unsuspicious electronic message sender identifiers that is based on previously obtained electronic messages and a second subset of unsuspicious electronic message sender identifiers that is based on a web browsing history of a user associated with the electronic message recipient (e.g. an address of the electronic message recipient). For example, the second subset of unsuspicious electronic message sender identifiers may be based on domain names taken from URLs in a web browsing history of a user associated with an e-mail address. The browsing history may be determined on the server side or at the client side, e.g. through a web proxy server, which may use authentication to map the web browsing history to the user associated with the electronic message recipient, or through a browser plugin or browser extension, which may collect the websites visited by the user. For example, the web browsing history may comprise information related to one or more websites visited by the user. In some embodiments, the information related to the one or more websites visited by the user may be obfuscated, e.g. may comprise hash values of web site addresses of the one or more web sites. As the web browsing history may yield (only) the domain names of the websites visited by the user, but might not yield specific electronic message sender identifiers, i.e. e-mail addresses, the second subset of unsuspicious electronic message sender identifiers might, initially, (only) comprise generic electronic message sender identifiers, e.g. (only) the domain-part (and not the user part) of the electronic message sender identifiers, or electronic message sender identifiers comprising one or more wildcards. In some embodiments, the generic message sender identifier may be replaced by a specific electronic message sender identifier, e.g. after an electronic message has been received that matches the generic electronic message sender identifier. In this case, an unsuspicious electronic message sender identifier of the second subset of unsuspicious electronic message sender identifiers may be moved to the first subset of unsuspicious electronic message sender identifiers.

In at least some embodiments, the unsuspicious electronic message sender identifiers of the second subset of unsuspicious electronic message sender identifiers may be temporary unsuspicious electronic message sender identifiers, i.e. an unsuspicious electronic message sender identifier of the second subset of unsuspicious electronic message sender identifiers may be deleted from the plurality of unsuspicious electronic message sender identifiers after a further pre-defined time-interval if no electronic message matching said unsuspicious electronic message sender identifier is received within the further pre-defined time-interval. In such cases, e.g. if an unsuspicious electronic message sender identifier is based on a web browsing history, the unsuspicious electronic message sender identifier may be stored together with a time, at which a website associated with the unsuspicious electronic message sender identifier was accessed. The method may comprise deleting an unsuspicious electronic message sender identifier of the second subset of unsuspicious electronic message sender identifiers from the plurality of unsuspicious electronic message sender identifiers if a time at which a website associated with the unsuspicious electronic message sender identifier was accessed is further away from a current time than the pre-defined time interval.

To be able to incorporate the web browsing history into the generation of the whitelist, the respective information may be obtained. In other words, the method may comprise obtaining information related to the web browsing history of the user associated with the electronic message recipient. For example, the information related to the web browsing history may be obtained from a web proxy server or from a web browser extension. The method may comprise determining at least a part of the plurality of unsuspicious electronic message sender identifiers, e.g. the second subset of unsuspicious electronic message sender identifiers based on the information related to the web browsing history of the user associated with the electronic message recipient. For example, the method may comprise adding generic electronic message sender identifiers, e.g. domain-name parts of the electronic message sender identifiers, to the plurality of unsuspicious electronic message sender identifiers.

Consequently, an electronic message of the plurality of electronic messages may be omitted from the subset of electronic messages if the plurality of unsuspicious electronic message sender identifiers comprises a sender identifier of the electronic message. In other words, an electronic message of the plurality of electronic messages may be selected for the subset of electronic messages if an electronic message sender identifier (i.e. e-mail address, social media handle, or telephone number) of the electronic message is comprised in the plurality of suspicious electronic message sender identifiers and absent from the plurality of unsuspicious electronic message sender identifiers. An unsuspicious electronic message sender identifier may be an electronic message sender identifiers that has previously been used for transmitting an electronic message that is likely to be desired by the particular electronic message recipient.

The at least one interface 12 may correspond to one or more inputs and/or outputs for receiving and/or transmitting information, which may be in digital (bit) values according to a specified code, within a module, between modules or between modules of different entities.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

In at least some embodiments, the storage module may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage. The plurality of unsuspicious electronic message sender identifiers and/or the plurality of suspicious electronic message sender identifiers may be stored within the storage module, e.g. within a file-based storage or within a database.

More details and aspects of the method, apparatus and electronic message server are mentioned in connection with the proposed concept or one or more examples described above or below (e.g. FIGS. 2a to 4f). The method, apparatus and electronic message server may comprise one or more additional optional features corresponding to one or more aspects of the proposed concept or one or more examples described above or below.

Figure 2A:
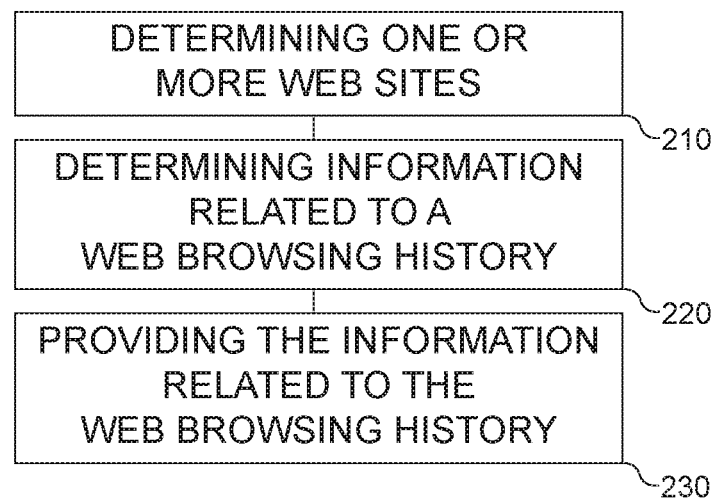
FIG. 2a shows a flow chart of an embodiment of a method for providing information related to a web browsing history.

FIG. 2a shows a flow chart of an embodiment of a method for providing information related to a web browsing history. The method comprises determining 210 one or more websites that are accessed by a user. The user is associated with an electronic message recipient, e.g. with an e-mail address. The method comprises determining 220 the information related to the web browsing history of the user associated with the electronic message recipient based on the determined one or more websites. The method comprises providing 230 the information related to the web browsing history to an e-mail server. The information related to the web browsing history is provided to the e-mail server to enable a determination of a whitelist of unsuspicious electronic message sender identifiers based on the information related to the web browsing history.

Figure 2B:
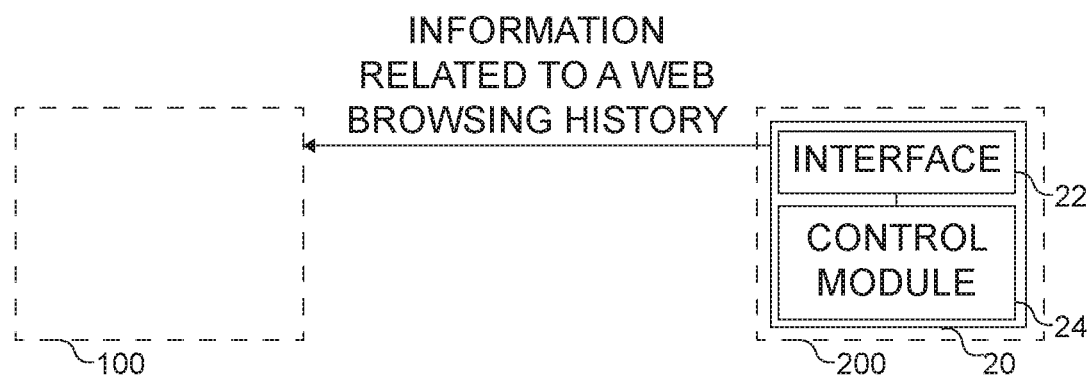
FIG. 2b shows a block diagram of an embodiment of an apparatus for providing information related to a web browsing history.

FIG. 2b shows a block diagram of an embodiment of an apparatus 20 for providing information related to a web browsing history. The apparatus 20 comprises at least one interface 22 for communicating with an e-mail server 100. The apparatus 20 comprises a control module 24, which is coupled to the at least one interface. The control module may be configured to execute the method of FIG. 2a, e.g. in conjunction with the at least one interface 22. The control module is configured to determine one or more web sites that are accessed by a user. The user is associated with an electronic message recipient. The control module is configured to determine the information related to the web browsing history of the user associated with the electronic message recipient based on the determined one or more web sites. The control module is configured to provide the information related to the web browsing history to the e-mail server 100. The information related to the web browsing history is provided to the e-mail server to enable a determination of a whitelist of unsuspicious electronic message sender identifiers based on the information related to the web browsing history.

The following description relates to both the method of FIG. 2a and the apparatus 20 of FIG. 2b.

The method comprises determining 210 one or more websites that are accessed by the user. For example, the method may comprise monitoring a web usage of the user to determine 210 the one or more web sites that are accessed by the user. The one or more websites that are accessed by the user might be determined at different points at a system. In some embodiments, the method may be implemented or executed by a web proxy server. FIG. 2b may show a web proxy server 200 comprising the apparatus 20. The user might use user-specific credentials or a user-specific internet protocol (IP) address to access the web proxy server. In this case, the method may comprise determining 210 the one or more websites that are accessed by the user by identifying the user based on the user-specific credentials or based on the user-specific IP address, and by logging the one or more websites for the user based on the identification of the user. Alternatively, the method may be implemented or executed by a web browser extension. In this case, FIG. 2b may show a web browser extension 200 comprising the apparatus 20. The one or more websites may be determined by logging the one or more websites using the web browser extension of a browser of the user.

The user is associated with an electronic message recipient. For example, the user may be the intended recipient of the electronic message. For example, the electronic message recipient may be an e-mail address, and the user may use the e-mail address.

The method further comprises determining the information related to the web browsing history of the user associated with the electronic message recipient based on the determined one or more websites. For example, the method may comprise compiling or accumulating the one or more websites for the information related to the web browsing history. For example, the method may comprise annotating the determined one or more websites with an access time for the information related to the web browsing history. For example, the web browsing history may comprise at least one of a domain name of the one or more websites, a time, at which the one or more websites were addressed, and a frequency of an access to the one or more websites. In some embodiments, the method may further comprise obfuscating (e.g. hashing) the domain names of the one or more websites for the information related to the web browsing history.

The method comprises providing 230 the information related to the web browsing history to the e-mail server. For example, the e-mail server may comprise an interface for obtaining the information related to the web browsing history, e.g. a HTTP (hypertext transport protocol) based interface, and the method may comprise providing the information related to the web browsing history to the e-mail server via the interface of the e-mail server. Alternatively, the web proxy server or the browser extension may comprise an interface for providing the information related to the web browsing history, and the method may comprise providing the information related to the web browsing history to the e-mail server via the interface of the web proxy server or of the web browser extension, e.g. upon request of the e-mail server.

The information related to the web browsing history is provided to the e-mail server to enable a determination of a whitelist of unsuspicious electronic message sender identifiers based on the information related to the web browsing history. For example, the information related to the web browsing history may be provided to the e-mail server for the determination of the whitelist of unsuspicious electronic message sender identifiers.

In more general terms, the e-mail server 100 may be an electronic message server, e.g. an electronic message server as introduced in connection with FIGS. 1a to 1c.

The at least one interface 22 may correspond to one or more inputs and/or outputs for receiving and/or transmitting information, which may be in digital (bit) values according to a specified code, within a module, between modules or between modules of different entities.

In embodiments the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

More details and aspects of the method, apparatus and web proxy server/web browser extension are mentioned in connection with the proposed concept or one or more examples described above or below (e.g. FIGS. 1a to 1c, 3 to 4f). The method, apparatus and web proxy server/web browser extension may comprise one or more additional optional features corresponding to one or more aspects of the proposed concept or one or more examples described above or below.

Embodiments provide a method for protecting against message bomb attacks and email bomb attacks, in particular.

At least some embodiments are implemented in a first approach under the name of EmailGlass, which may be used to efficiently defeat message bomb attacks and email bomb attacks, in particular. This is explained in the following.

Spam emails cause harm for companies, citizens, and governments. Today, there are many products to fight spam. However, spammers improve their methods to circumvent protection measures. Pseudo-spam sent in an email bomb attack is a particular type of spam that can paralyze whole organizations. So far, there was no efficient protection against email bomb attacks. Our approach provides a novel approach for protection against email bomb attacks.

One issued to be tackled for email bomb detection is as follows: A method may be required that can decide whether a received email was sent upon legitimate subscription carried out by the receiver or whether it was sent within an email bomb attack initiated through subscription carried out by a hacker. As an additional condition it may be required that the solution has no information available about subscriptions, i.e., no information about where a user has subscribed and no information about where he has not subscribed. In other words, approaches may be able to decide that an email should get in a receivers inbox whereas the same email with the same content coming from the same sender will be blocked for another user on the same email server. All this may work in the background without requiring interaction from users, e.g., the decision about blocking might not be based on feedback from the user side.

The proposed method may provide an effective and efficient solution for this issue and it may fulfil the conditions described above. The solution applied in the proposed method may exploit knowledge about specific characteristics of email bomb attacks attacks. Based on the fulfillment of these characteristics, embodiments may decide whether a received email was sent in an email bomb attack or legitimately. In particular, the solution may exploit time-related characteristics of email bomb attacks. When email bomb attacks start, then the victim's inbox typically receives many emails as pseudo-spams within short time, e.g., roughly 100 pseudo-spams within 5 minutes. However, from the reception of so many emails within a short time one cannot conclude in general that an email bomb attack occurs. In order to recognize an email bomb attack embodiments may implement some kind of a time-based trap over a queue that delays email delivery for a given time T (e.g. the pre-defined time interval), e.g., 5 minutes. This time-based trap may handle exclusively those emails (e.g. the subset of electronic messages) whose senders are contained in a blacklist. The blacklist (e.g. the information related to a plurality of suspicious electronic message sender identifiers) may comprise (all) sender addresses that are known to be used by hackers for email bomb attacks. Within the delay of the time-based trap, embodiments may analyze whether an email bomb attack is running or not. Exceeding a fixed threshold (e.g. the threshold) in the queue for a user's account may spring the trap.

For at least some embodiments, it may be assumed that there is a blacklist (the information related to a plurality of suspicious electronic message sender identifiers) with sender addresses. The blacklist may be up-to-date with (all) known senders that hackers usually involve in their email bomb attacks as they are offered in the darknet. The blacklist may be kept up-to-date by running a honeypot network with accounts that are flooded through email bomb attacks.

Figures 2, 3:
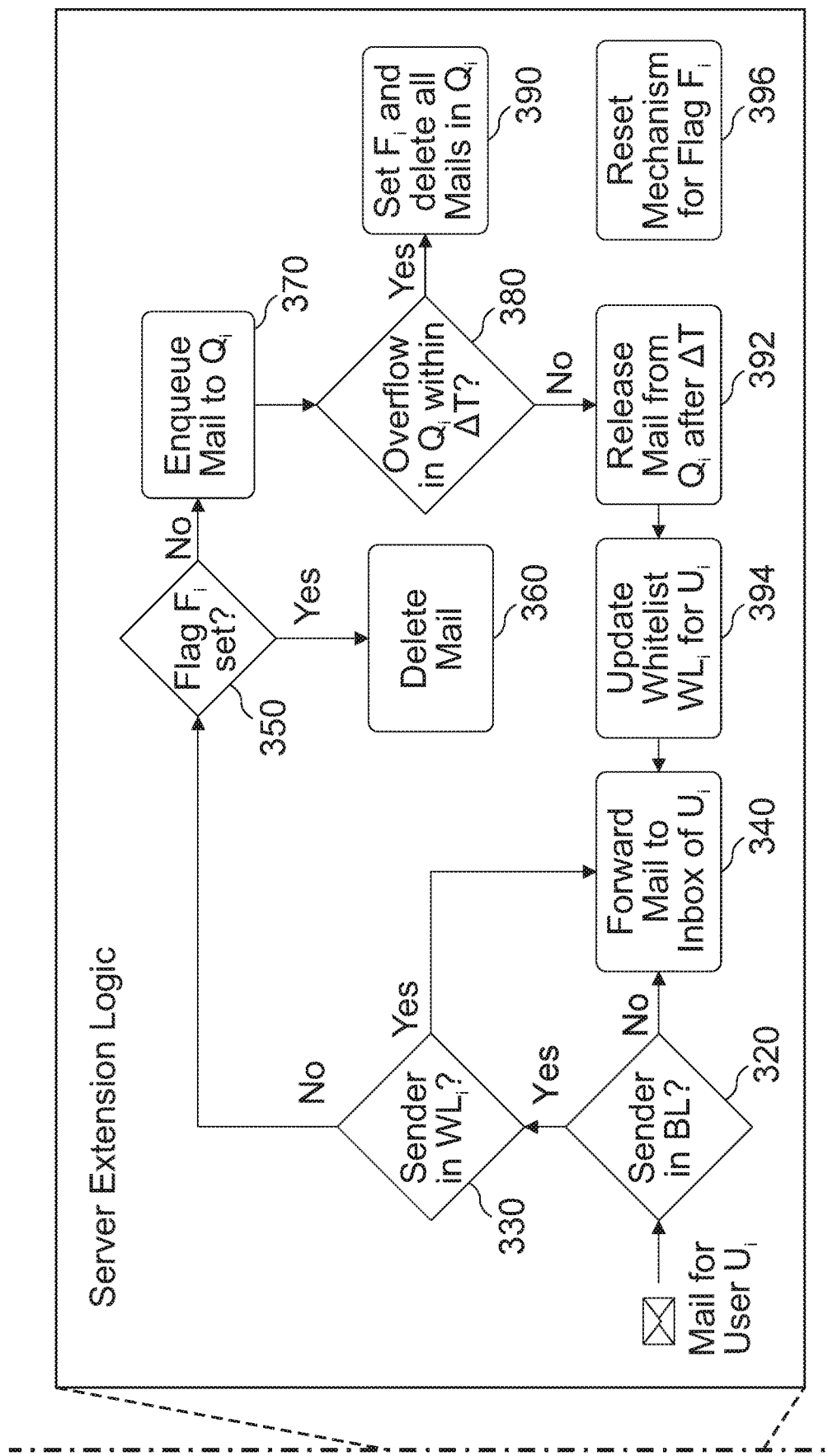

At least some embodiments may be running as a Server Extension (e.g. the apparatus 10) on the email server (e.g. the electronic message server). A sketch of the approach is depicted in FIG. 3. FIG. 3 shows a schematic diagram of an approach for processing a plurality of electronic messages. FIG. 2 shows an e-mail server 300 (e.g. the electronic message server) with mailboxes of users (e.g. particular electronic message recipients) $U_1$ to $U_m$ with personal whitelists $WL_1 \ldots WL_m$ (e.g. the plurality of unsuspicious electronic message sender identifiers) and Queues $Q_1$ to $Q_m$ (e.g. for storing the subset of electronic messages). The server receives mails $S_1 \ldots S_n$ over the internet. The server 300 is coupled to or comprises a server extension 310, which comprises a global blacklist BL (e.g. the information related to a plurality of suspicious electronic message sender identifiers).

The Server Extension may use the sender addresses stored in the blacklist BL. BL may be a global list, i.e., it is valid for all users that have an email account on the server. For each User $U_i$ there may be a whitelist $WL_i$ and a queue $Q_i$ in which incoming suspicious emails are stored for a fixed time T, at most. After an email has been stored in the queue for a time T, the queue may release the email. Releasing an email from the queue may create an empty space in the queue for a new incoming suspicious email. Each queue might store a limited number of emails. Exceeding the queue limit with incoming suspicious emails may spring the time-based trap, i.e., all emails in the queue are deleted and the flag $F_i$ is set. The time-based trap may be locked as long as the flag $F_i$ is set. Note that each user account may have its own time-based trap, and thus, its own flag. The time-based trap may be kept locked for a fixed time t; it may controlled by the reset mechanism 396 for the flag $F_i$.

When an email for user $U_i$ is received, the server extension logic may first check or determine 320 whether the sender is in the blacklist; if not, the email is delivered 340 to $U_i$. If yes, then the email is suspicious and the server checks/determines 330 whether the sender is the user's personal whitelist $WL_i$; if yes, the email may be delivered 340 to $U_i$. If not, the logic may check whether the time-based trap is locked 350 (i.e. if Flag $F_i$ is set); if yes, the email may be (immediately) blocked for delivery and deleted 360. If the time-based trap is not locked, then it may be inserted (i.e. enqueued) 370 in the queue $Q_i$. An overflow of the limit in the queue $Q_i$ (within the pre-defined time interval $\Delta T$) may spring 380 the time-based trap; this may cause deletion 390 of (all) emails in queue $Q_i$ (and setting of Flag $F_i$). If a suspicious email survives at the queue without overflow during $\Delta T$, the email may be released 392 from the queue $Q_i$, its sender may be added 394 to the whitelist $WL_i$ (of user $U_i$) and the email may be delivered to the receiver $U_i$.

The introduction of the delay t for unlocking the time-based trap may be reasonable. It may allow that a user is able to subscribe newsletters from senders that are contained in the blacklist after he has become victim of an email bomb attack in the past.

In some cases, a hacker might try to circumvent the protection by extremely slowing down his attack. In this case, the solution would achieve its goal because a distributed denial of service on a user's inbox is prevented in effect. Since the threshold and the exact value of $\Delta T$ can be configured by the server's administrator and both are not public, a hacker may have to be careful not to exceed the queue limit within T. If it is exceeded, the trap may lock and initiate the blocking of all pseudo-spams, even if the attack is slowed down again. Furthermore, hackers might not be able to control the exact time when senders will distribute their newsletters, so there may be the risk to spring the trap even if attacks are slowed down extremely.

Some embodiments may introduce a delay of suspicious emails, which may be acceptable. The delay may be in the range of minutes and not in hours by keeping the number of the queue limit small.

The benefits of at least some embodiments may be summarized in a short and clear way: At least some embodiments may avoid real risks and harm for citizens and organizations caused by email bombs. It may protect owners of email accounts against many pseudo-spams leading to a distributed denial of service that renders email inboxes useless. Being protected against email bombs has compelling advantages. It may save resources and costs and may support functionality and availability of email as an important medium for asynchronous communication in business and private contexts.

Reception of email bombs can have undesired effects on the availability of other emails. A typical consequence of email bomb is that the victim cannot receive other emails. The high number of pseudo-spams received in an email bomb attack—typically several thousand emails!—can exceed the storage limit of the victim's inbox. This means that the reception of other emails may be refused until the victim clears space by deleting pseudo-spams. When deleting many pseudo-spams manually, it is easily possible that the victim accidentally deletes important emails.

Embodiments may further provide a prevention of workload for receivers. Without having an effective and efficient solution for autonomous prevention of email bomb attacks such as EmailGlass that filters pseudo-spam, victims may have to cope with pseudo-spams more or less manually. This would result in a tremendous workload for each victim and a waste of resources. Workload means here clearing the inbox manually and moving pseudo-spams to the spam folder that new emails coming from the same sender will be blocked. Another possibility is manually unsubscribing newsletters and deleting newsletters. However, in many cases unsubscribing is not possible when newsletters are written exclusively in foreign languages. The potential extent of the workload depends on the number of senders involved in the email bomb attack. Current offers in the darknet may range from a few thousands up to 50.000 senders.

The consequences described above may occur again when the email bomb attack is run for a second time. Then, resubscribing would overwrite unsubscribing, and restarting a hacker script would undo all the work done by the victim to get rid of pseudo-spams. With at least some embodiments, the protection may run in the background, so that the user is not affected. Furthermore, no user interaction might be required, even not in the case repeated attacks.

The benefits of various embodiments may become even clearer when understanding the ecosystem of these attacks and the limitations of the effectivity of alternative approaches, e.g., prosecution. Hackers and their principals are commonly relatively well protected. Attacks may be very cheap for principals, commissioning may leave no traces in the darknet, and hackers may operate from foreign countries so that possibilities for criminal prosecution are very limited. There might be no risk for hackers and principals that prevents them from continuing. This emphasizes the benefit of embodiments.

Today, roughly every person uses email, many users even have several email addresses. Each user may require that all its email inboxes may be protected against email bombs. If not, infected inboxes become useless and can hardly be used anymore. The EmailGlass software filters pseudo-spam. The software shall be deployed at the customer's email server.

More details and aspects of embodiments are mentioned in connection with the proposed concept or one or more examples described above (e.g. FIG. 1a to 2b). Embodiments may comprise one or more additional optional features corresponding to one or more aspects of the proposed concept or one or more examples described above or below.

Embodiments provide a method for protecting against email bombs as Distributed Denial of Service Attack, which may be implemented similar to the method introduced above.

The frequency of Distributed Denial of Service (DDoS) attacks is increasing. They may cause harm to companies, citizens, and governments. A particular type of these attacks uses email bombs that render email accounts useless. Cyber criminals offer those attacks in the darknet for rent or as a service for a small fee against Internet users as victims. The invention described in the following may be the first solution offering protection against these attacks.

Modern DDoS attacks may be an increasing and severe problem for companies, governments, and citizens. The execution of DDoS attacks may be often very simple and attackers may use them for causing harm to victims, and even pressing them for money, such as in the WannaCry ransomware attack. Email bombs may be a specific type of DDoS attacks that may be carried out by exploiting multiple legitimate applications as reflectors to flood email accounts of victims. As a result of the email bomb, the email address of the victim may be flooded with thousands of emails from multiple legitimate senders congesting the user's inbox. Some approaches as for the protection against spam emails may be useless for the protection against email bombs. It is known that such email bomb attacks may be easily rented in the darknet. In order to initiate such mail bomb DDoS attacks against any victim one may commission botnets for only a few US-$ (e.g., 5 US-$). Some attack offers may involve 50.000 senders in a single email bomb, and attackers may offer also higher volumes for higher fees.

The principle behind email bombs may be simple, nevertheless effective. First the attacker may collect a large number of email notification services, such as newsletters, trade websites. These legitimate services may be unwittingly exploited by the attacker to flood Internet victims by registering the victim's email address at such a website. The attacker may collect the list of such websites that send continuous reminders or notifications when provided with some email address for registration. Then, using this list of websites, the attacker may register a victim's email address to a large number of email notification services, such as newsletters, sales offers. The attacker's registration process may be automated—the attacker's crawler issues multiple registration requests to the services on the list of websites. These services may then in turn flood the inbox of a victim with thousands of emails within short time.

Email bomb attacks may be easily possible since at most websites registration processes is automated very easily. Websites may not be prepared sufficiently to prevent automated registration, e.g., by deploying strong CAPTCHAs. Furthermore, many newsletter senders apply opt-out, i.e., they keep on sending newsletters until the receiver manually unsubscribes. Creating a filtering rule to move these DDoS emails to a junk folder may be not possible since they originate from legitimate sources, which may make it harder to classify them. Other receivers of the same email content may have actually registered the newsletter at the corresponding web site. So it may be hard for a filter to decide whether such an email may be part of an attack whereas a copy of the same email to another receiver may be a legitimate email.

A simple, but unfortunately very inefficient solution for victims to cope with email bombs may be to manually unsubscribe these emails. This may be done at each website. Often, the function for unsubscribe may be only provided in a foreign language, or even in a foreign alphabet, so that the victims may be not able to initiate the unsubscribe function. Without a concept that protects the email account against ongoing reception of emails that have not been subscribed by the victim, the email account may be lost. Even if a victim successfully unsubscribes at all web sites, for the attacker it may be just the start of a single script to re-register the victim's email address again and to render the victim's work completely in vain.

Email bombs may imply a relatively new, yet rapidly growing threat, which was not studied in the past. Intuitively it may appear that this type of attack may be a similar threat to spam, hence defenses against spam may be effective against email bombs. However, so far there may be no effective defenses against email bombs. There may be a few critical differences between the two attacks. First, email bombs may be significantly more devastating for victims than spam. Spam emails may be unwanted emails that typically may be not targeted at a specific victim—the spammer aims to hit as many targets as possible, even in the case of other DDoS attacks as ransomware, to optimize profit. In contrast, email bombs target all the attack volume at one selected victim. Second, while spam mails may be filtered, detection of email bombs may be challenging.

The most closely related threat to email bombs may be spam distribution and DDoS attacks. A natural question is, whether anti-spam or DDoS defenses may be used to block email bombs. However, there may be a few differences between email bombs and the other two types of attacks, which render anti-spam or DDoS defenses ineffective for blocking email bombs.

Anti-spam defenses may be classified according the following filter objectives:

Content: Content-based filtering searches for specific terms which may be classified as spam. For instance, emails suggesting that the recipient may inherit a large amount of money if he emails the sender or emails with advertisements of specialized products, such as medicine. Content based filtering with appropriate terms may filter such emails. Unfortunately, these defenses may be ineffective against confirmation or registration emails from legitimate web services. One could argue that the content based filtering mechanisms may be adjusted to filter email bombs. However, email bombs utilize content from legitimate third parties. This content, such as registration or confirmation functionalities, may be used by users often, e.g., when registering to news, blogs, or purchasing goods online. Hence they may also be legitimately generated and might not be generally classified as an unwanted email. The problem may be that both email content and sender may be exactly identical in the case of intentional subscription and in the case of subscription by hackers. So the challenge for a protection method may be not to identify an unwanted content but rather to decide whether a newsletter may be sent upon the receiver's own initiative or a hacker's initiative.

Reputation: Spam emails may originate from non-popular domains, or domains that were recently registered. This may be due to the fact that spam domains, once detected, may be quickly blacklisted. Hence spammers frequently register new domains from which they distribute spam. Defenses which check domain reputation (age, owner) effectively block spam. Email bombs may be generated by reputable domains, many of which were registered more than a decade ago and may be owned by well-known owners. Hence, reputation based filtering may be not effective for blocking email bombs.

Origin: Spam emails may be often sent from spoofed email addresses, the attackers either spoof the FROM field in SMTP [RFC5321] (Simple Mail Transfer Protocol, Request for Comments 5321) payload or the MAIL FROM field in the SMTP header. The former may be presented to the user in the email, the latter may be part of the SMTP headers which the email servers exchange. There may be different defenses for detecting emails sent from spoofed domains (domain based as well as cryptographic signatures over the content). Those defenses may be unfortunately not effective against email bombs since the email addresses in those emails may be not spoofed, but may be issued by real services.

Furthermore, DDoS (Distributed Denial of Service) approaches might be considered to defend against e-mail bombs. Unfortunately, there might not be an effective and practical method for victims or their email service providers to cope with email bombs. Nevertheless, email bomb DDoS may cause a tremendous waste of resources at the receiver side, and thus, it may cause financial damages. Typical DDoS defenses might not be used to mitigate the email flood caused by email bombs. Since the emails may be not sent from spoofed IP addresses, filtering mechanisms on IP or transport layers might not block them. Application layer defenses that attempt to identify connections from bots to services may be not suitable for client side protection that may be needed in the setting of email bombs. These defenses may attempt to identify malicious clients which try to exhaust server resources, looking at sources which behave as potential bots. In case of email bombs, the emails may be sent by legitimate (non-malicious) services, and hence these connections would classify as legitimate. From a single sender's perspective, it may be assumed that the larger number emails may be sent to receivers that have legitimately registered for email reception compared with number that have been registered by attackers. Simply blocking emails from legitimate services might result in connectivity problems for users that really want to use these services. Websites could deploy mechanisms such as strong CAPTCHAs to block automated registration, but this might not help against emails that may be sent by parties that do not deploy such mechanisms, which holds for the majority of websites, unfortunately.

Embodiments may provide an effective and efficient solution for the protection against DDoS induced by email bombs. A challenge to be solved by the invention may be to identify whether a received email may be part of an email bomb attack or if it may be a legitimate email, e.g., that was sent following a subscription that a user initiated. The same email sent by the same sender may in one case be legitimate and in another case be the result of an email bomb. The approach applied in the invention may exploit knowledge about specific characteristics of email bomb attacks. The system may monitor domains of web services accessed by users. Then, when an email bomb attack may be detected, only emails originating from services that may be not suspicious and that have been accessed by the user may be received in the user's inbox. The other emails from those services may be blocked.

In the following, first the components of the method, as it is used in an exemplary embodiment, may be described and afterwards the method itself.

Embodiments may use several components, which may consist or comprise of a constantly updated Black List of senders, user-specific White Lists, a web proxy module, and email server module. The components involved in the invention according to the exemplary embodiment are depicted in FIG. 4a.

Figure 4A:
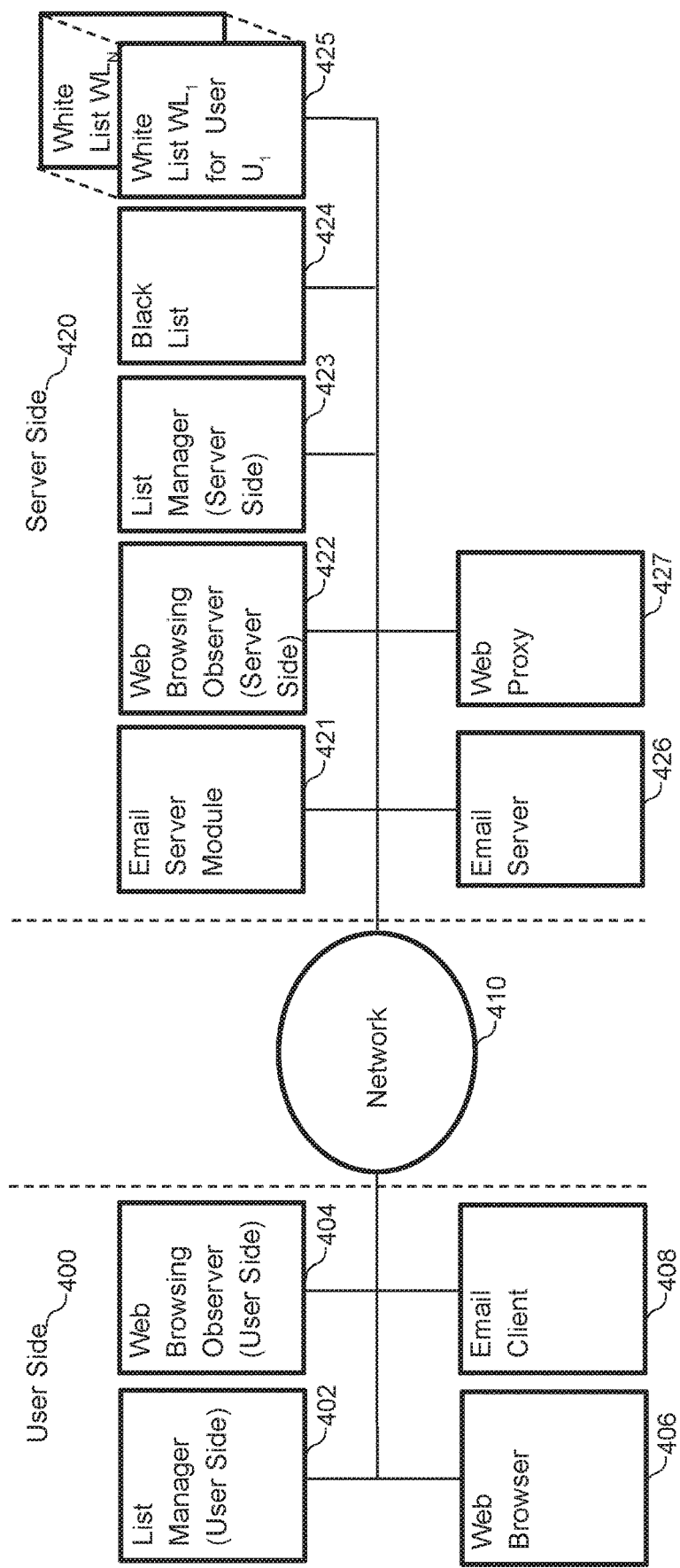
FIG. 4a shows a schematic overview of components of a system according to an embodiment.

FIG. 4a shows a schematic overview of components of a system according to an embodiment. At least some embodiments may involve a server side 420 and a user side 400. The server side installation may provide services to a set of users expressed by $U_1, \ldots, U_N$. Each such user may have an email account on the server side, i.e., $U_i$ comprises also the user's email account. In case a user holds several email accounts on the server side, $U_i$ may comprise the set of the user's email accounts on the server.

Some embodiments may comprise components that may be located on the user side 400, where user means a recipient of emails, and on the server side 420 as depicted in FIG. 4a. Both sides may be connected over a network 410; this may be a local network, e.g., if the user is an employee of an enterprise that runs its own email server, or it may be an open and wide area network, e.g., if the user may be a client of a commercial email service. On the user side, in some embodiments, it may be assumed that a user uses a conventional web browser 406 and an email client 408. On the server side, in some embodiments, it may be assumed that a "conventional" email server 426 and a web proxy 428 are used. The components used in embodiments may be new; for the purpose of protection against email bomb attacks they interact with these "conventional" components.

In the following, the new components according to some embodiments may be introduced.

At least some embodiments may comprise a List Manager. The List Manager may be a component that may be used to manage the lists used by the invention such as the Black List and the White Lists. It may provide functionality to add new entries to the list, modify list entries and remove existing entries from the list. The List Manager may encompass a function to control access to these lists by checking user credentials. In some embodiments, these credentials can consist or comprise of login and password. The List Manager may manage the lists upon certain events, e.g., with respect to received emails or to websites accessed by the user. Furthermore, it may provide its functionality, dependent on the embodiment, to administrators of the email server and to users. In some embodiments, the List Manager may be a component 423 that runs at the server side. In some other embodiments of the invention, the List manager may also be deployed at the user side 402. In further embodiments, the List Manager may consist or comprise of two subcomponents, one at the server side and the second at the user side. In other words, the list manager may be implemented by either or both of apparatuses 10 and 20 of FIGS. 1c and 2b.

Embodiments may further provide a Web Browsing Observer. The Web Browsing Observer may be a component that observes the browsing activities of the user and initiates the storing of the Internet addresses, e.g., as domain names, of accessed websites in the user's corresponding White List. For example, the Web Browsing Observer may correspond to the apparatus 20 introduced in connection with FIG. 2b. Information about accessed websites may be useful for the decision whether an email may be received legitimately, e.g., after subscription by the user, or upon an email bomb. In one embodiment of the invention, the Web Browsing Observer 422 may be located at the server side and may work as an extension component to the Web Proxy 427. In this embodiment, an organization may configure (all) web connections (e.g., under ports 80 or 443) to go through the local caching web proxy that may be typically used to reduce latency for communication of the clients and to reduces traffic on the networks and to the web servers. The web proxy component may monitor connections of all its users $U_1, \ldots, U_N$ to the services, and may initiate the List Manager to create an entry for each accessed web service in the White List $WL_i$ for each user $U_i$. In a second embodiment of the invention, the Web Browsing Observer 404 may be implemented as a Web Browser extension that may be located at the user side. In this embodiment, the Web Browsing Observer may initiate the user-sided List Manager to create entries for web services accessed by user $U_i$ in the corresponding White List $WL_i$. In a further embodiment, the Web Browsing Observer consists or comprises of a combination of the both previous embodiments of the Web Browsing Observer as subcomponents.

Embodiments may further provide an Email Server Module 423. The email server module may be configured to monitor incoming emails for email bomb attacks. For each user the Email Server Module may implement a queue $Q_i$. In this queue, the received emails may be buffered for a given time $\Delta T$ (e.g. the pre-defined time interval). The value of $\Delta T$ may be configured by a system administrator. (Only) after being stored for interval $\Delta T$ in queue $Q_i$, the email may be forwarded to the inbox of user as far as no email bomb attack is detected. If an attack is detected for user $U_i$, the received email for user $U_i$ may be blocked. When the number of emails for user $U_i$ coming from services on the Black List and not contained in the White List $WL_i$ (e.g. the plurality of unsuspicious electronic message sender identifiers) exceeds a specified threshold number within a given time interval, an email bomb attack may be detected. When email bomb attacks start then the victim's inbox typically receives multiple emails within short time, e.g., roughly more than 50 emails within a few minutes, e.g., 10 minutes. In order to recognize an email bomb attack, at least some embodiments may implement a time-based trap over a queue $Q_i$ for user $U_i$ that delays email delivery for time $\Delta T$, e.g., 3 minutes. For the interval of $\Delta T$, each received suspicious email may be kept in the queue. There may be a limited number of emails that may be stored in the queue; let this queue limit be L (e.g. the threshold). If the number of emails to be held in the queue exceeds the value of L, then the Email Server Module may have detected an email bomb attack. As a consequence of detection, (all) emails held in the queue may be deleted from the queue and these emails may be blocked, i.e., they may be not forwarded to the recipient's inbox. This time-based trap may handle exclusively those emails whose senders may be contained in the Black List (e.g. the plurality of suspicious electronic message sender identifiers) and not contained in the user-specific White List $WL_i$; as such, they may be considered to be suspicious. Within the delay of the time-based trap, the Email Server Module analyzes whether a mail bomb attack may be running or not. Exceeding the queue limit L for a user's account springs the trap for this user. Once the time-based trap may be triggered, all suspicious emails for user $U_i$ may be immediately blocked upon reception; suspicious means here that the email sender address matches to a Black List entry and it does not match to an entry in $WL_i$. For the purpose of indicating that the time-based trap has sprung, the invention provides a binary flag $F_i$ that indicates whether the account of user $U_i$ has been attacked with an email bomb so far. In some embodiments, the flag $F_i$ may be set to 0 if there has been not attack for the account of $U_i$ so far, in the contrary case the flag $F_i$ may be set to 1. In some other embodiments, the inverse logic may be applied for flag $F_i$.

Embodiments may further provide a Black List, e.g. the plurality of suspicious electronic message sender identifiers. The Black List BL may contain entries that may be related to sender email addresses contained in email bombs. These may be either candidates as potential senders in email bomb attacks, or that may be already well-known for having been misused in email bomb attacks respectively domain names of the email sender addresses. The list entries may be email addresses, domain names, or regular expressions. The Black List BL may be a global list; it may be valid for all users $U_1, \ldots, U_N$ that have accounts on the same email server, that belong to the same organization, or that may be using email services of the same email provider. The entries of the Black List may be used for blocking emails that are received within email bomb attacks. An email may be blocked (e.g. discarded) according to the method applied by the Email Server Module if the sender address of the email matches with an entry of the Black List. In some embodiments, one such Black List may be available. From time to time, an older Black List may be replaced with a new Black List. In some embodiments, the Black List may be implemented with a database. In some other embodiments, the Black List may be a simple file, e.g., with a comma-separated list of email addresses or domain names as values.

Embodiments may further provide White Lists, e.g. the plurality of unsuspicious electronic message sender identifiers. There may exist a White List for each user or for each recipient email address on the email server, i.e., there may be a White List $WL_i$ for each user account $U_i$ on the email server. Similar to the Black List, a White List may contain entries that are related to sender email addresses contained in email bombs. The entries of White Lists $WL_1, \ldots, WL_N$ may be considered as legitimate senders that should not be blocked for the corresponding user in the protection against email bomb attacks according to embodiments. In particular, $WL_i$ contains entries that are related to email sender addresses that may be considered as legitimate senders for user account $U_i$. There may be two types of entries in the White List, Type One and Type Two. As Type One, an entry $address_{i_j}$ in $WL_i$ consists or comprises of a single value that may be an email address, a domain name, an URL of a resource accessed on a website, or a regular expression, i.e., a White List $WL_i$ consisting only of Type One entries looks like $WL_i=(address_{i_1}, \ldots, address_{i_j}, \ldots, address_{i_M})$. As Type Two, an entry may be a pair of values $(address_{i_j}, date_{i_j})$. The first part of this pair may be similar to Type One entries. The second part of this pair may give a date in time. In some embodiments, it may consist or comprise of year, month, hour, minute, and second. The date may give the information, when a website has been accessed. When the date part of the entry is deleted, then a Type Two entry may become a Type One entry. A White List $WL_i$ consisting only of Type Two entries may look like $$WL_i=((address_{i_1}, date_{i_1}), \ldots, (address_{i_j}, date_{i_j}), \ldots, (address_{i_M}, date_{i_M}))$$

In an embodiment of the invention, White List $WL_i$ contains both types of entries, such as $WL_i=(address_{i_1}, (address_{i_2}, date_{i_2}), (address_{i_3}, date_{i_3}),$ $address_{i_4}, \ldots, (address_{i_j}, date_{i_j}), \ldots, (address_{i_M}, date_{i_M}))$ The White List $WL_i$ may be expanded with entries of the Type One $address_{i_j}$, e.g., email addresses, upon reception of emails by $U_i$ that may be assumed not being part of an email bomb. Furthermore, the White List $WL_i$ may be expanded with entries of Type Two $(address_{i_j}, date_{i_j})$, e.g., domain names of web sites or an URL a user visits through web browsing and the browsing date. For example, the Type One entries may correspond to the first subset of unsuspicious electronic message sender identifiers and the Type Two entries may correspond to the second subset of unsuspicious electronic message sender identifiers.

In the following, the technical mechanisms applied by some embodiments for the protection against email bomb attacks are described.

Web Browsing Observation and New White List Entries: When user $U_i$ browses through the Internet by using his Web Browser, the Web Browsing Observer may extract the Internet addresses of the web traffic generated by user $U_i$ (e.g. implementing the Determining 210 one or more web sites that are accessed by a user). In some embodiments, the Web Browsing Observer may extract the complete URL or a part of the URL, in some other embodiments the Web Browsing Observer might extract only the domain name of web services accessed by user $U_i$. Let $address_{i_j}$ denote the result of this extraction by the Web Browsing Observer. Additionally, the Web Browsing Observer may assign the current date $date_{i_j}$ to the $address_{i_j}$. In some embodiments, the Web Browsing Observer may deal with $address_{i_j}$ and $date_{i_j}$ and may prepare them to be handed over to the next component (e.g. by determining the information related to the web browsing history). In some other embodiments, the Web Browsing Observer might deal only with $address_{i_j}$ to be handed over to the next component. In this embodiment, it may be assumed that the value of $date_{i_j}$ (and thus the information related to the web browsing history) may be created by another component, e.g., the List Manager. The Web Browsing Observer may then provide this data to the List Manager (e.g. the apparatus 10). This method may be illustrated in FIG. 4b. In some embodiments, the Web Browsing Observer may be located at the user side and work as an extension to the Web Browser. In some other embodiments, the Web Browsing Observer may be located at the server side and works as an extension to a Web Proxy.

Dependent on the embodiment of the invention, the List Manager may receive the data $address_{i_j}$ and $date_{i_j}$, or only $address_{i_j}$ respectively, and may append this date to the current White List $WL_i$. In case the List Manager only obtains the $address_{i_j}$ from the Web Browsing Observer, the List Manager may create $date_{i_j}$ for the current time, and may append this date to the current White List $WL_i$ (thus determining the information related to the web browsing history). In any case, the List Manager may determine at least a part of the plurality of unsuspicious electronic message sender identifiers based on the data $address_{i_j}$ and $date_{i_j}$, or only $address_{i_j}$. In some embodiments, information for all accessed web resources may be appended. This means that if one web resource is accessed more frequently than once, then there may be an entry for each access in $WL_i$. In some other embodiments, there might be only one entry for the value of address $address_{i_j}$ and the List Manager may replace the older value for $date_{i_j}$ with the newer value.

For example, the apparatus 10, e.g. the control module 14 of the apparatus 10, may implement or comprise the components 421 to 425 (and optionally components 426 and 427 as well). Apparatus 20, e.g. the control module 24 of apparatus 20, may implement or comprise the components 404/422 (the Web Browsing Observer) (and optionally component 402/422, the List Manager).

Figure 4B:
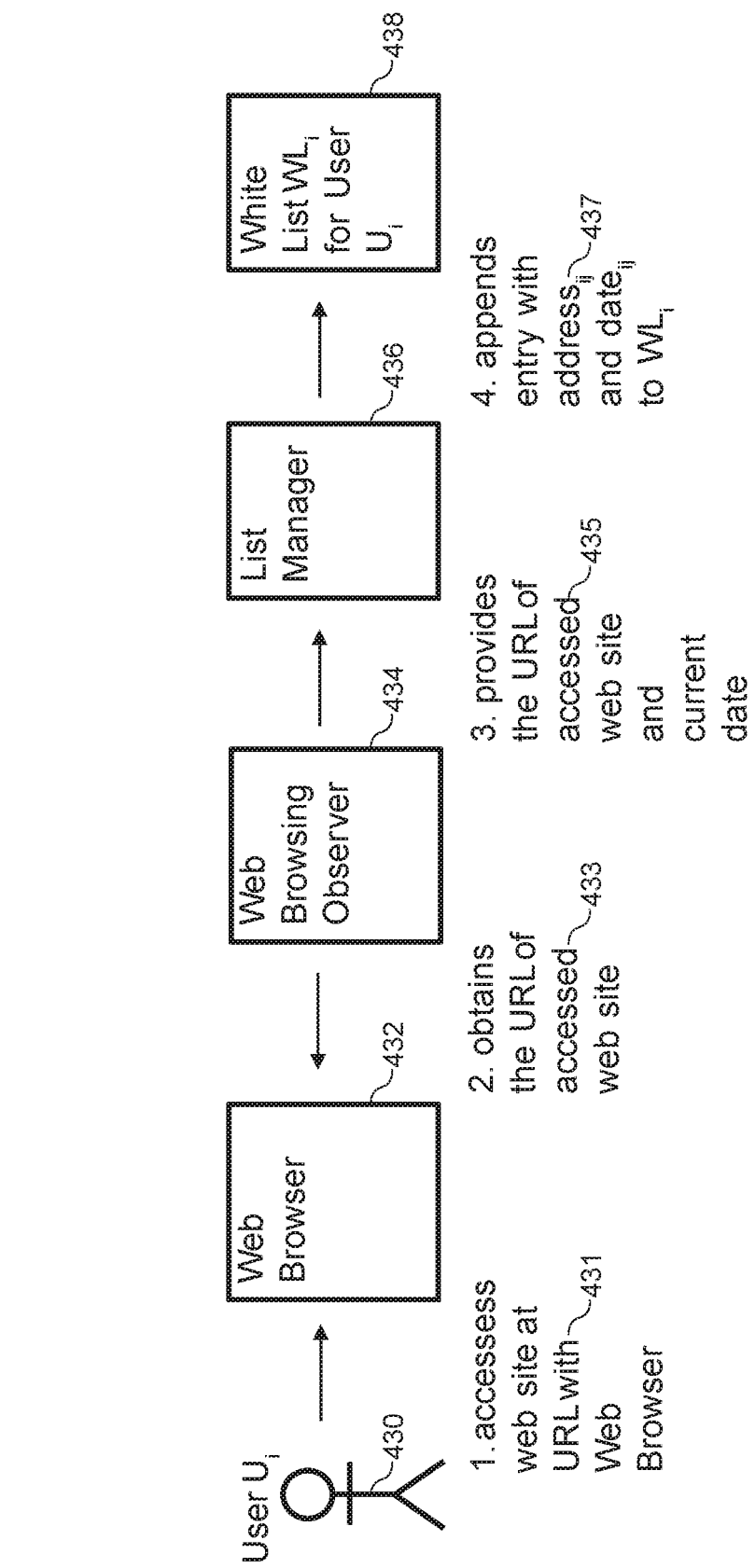
FIG. 4b shows a schematic diagram of a concept for providing a new white list entry derived from web browsing according to an embodiment.

FIG. 4b shows a schematic diagram of a concept for providing a new white list entry derived from web browsing according to an embodiment. In FIG. 4b, User $U_i$ 430 accesses 431 a website at an URL (Uniform Resource Locator) with a web browser 432. The URL of the accessed website may be obtained 433 by the Web Browsing Observer 434, which may provide 435 the URL of the accessed website and the current date to List Manager 436, which may append 437 the entry with $address_{i_j}$ and $date_{i_j}$ to White List $WL_i$ 438 for user $U_i$ 430.

The interaction between the Web Browsing Observer and the List Manager and the creation of new White List entries may allow that emails from a specific sender address may be received after the user has subscribed for these emails even if emails from the same sender address have been blocked before, since the sender address matches to the Black List of the invention.

Modifying and Deleting Entries from White List: The method for modifying and deleting entries from the White Lists consists or comprises of two functions. Both may be carried out automatically. Basically, there may be the assumption that a user $U_i$ receives the first email from a web service after legitimate subscription at date$_{ij}$ within a time interval D that might not be longer than a reasonable value. In some embodiments, D may be 24 hours. This means that after browsing to a web service and having initiated a Type Two entry in $WL_i$ without receiving an email from the address that matches to this entry within time interval D implies with high probability that User $U_i$ has not registered at this web service. This means that such a Type Two entry may be deleted.

Figure 4C:
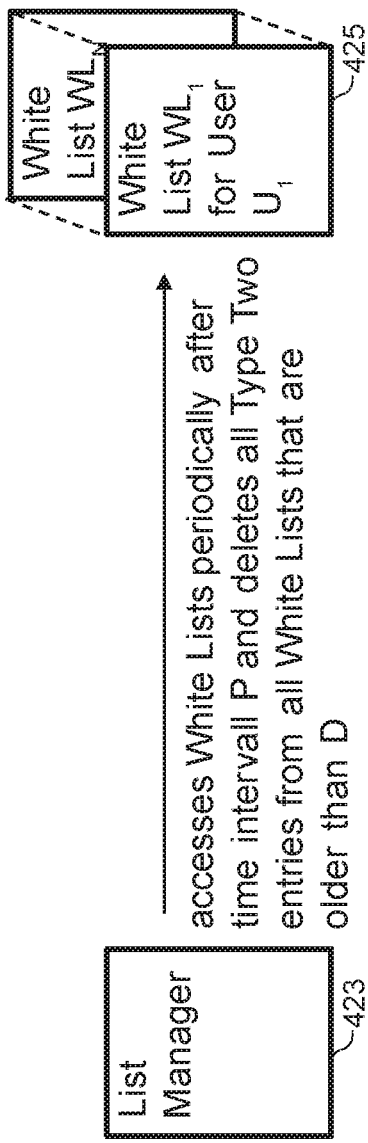
FIG. 4c shows a schematic diagram of a concept for a deletion of "type two" entries from white lists according to an embodiment.

In various embodiments, the control of such entries in White Lists and their deletion from the White lists may be carried out by the List Manager 423. This may be depicted in FIG. 4c. FIG. 4c shows a schematic diagram of a concept for a deletion of "type two" entries from white lists according to an embodiment. In order to delete such entries from all White Lists $WL_1, \ldots, WL_N$, the List Manager 423 may periodically access after time interval P (Periodic Interval) (all) White Lists 425 for which it has access rights and may analyze them for Type Two entries that may be older than D. Then, the List Manager may delete (all) Type Two entries older than D it has detected from the White Lists. In some embodiments, one may select a value of 1 hour for P.

Figure 4D:
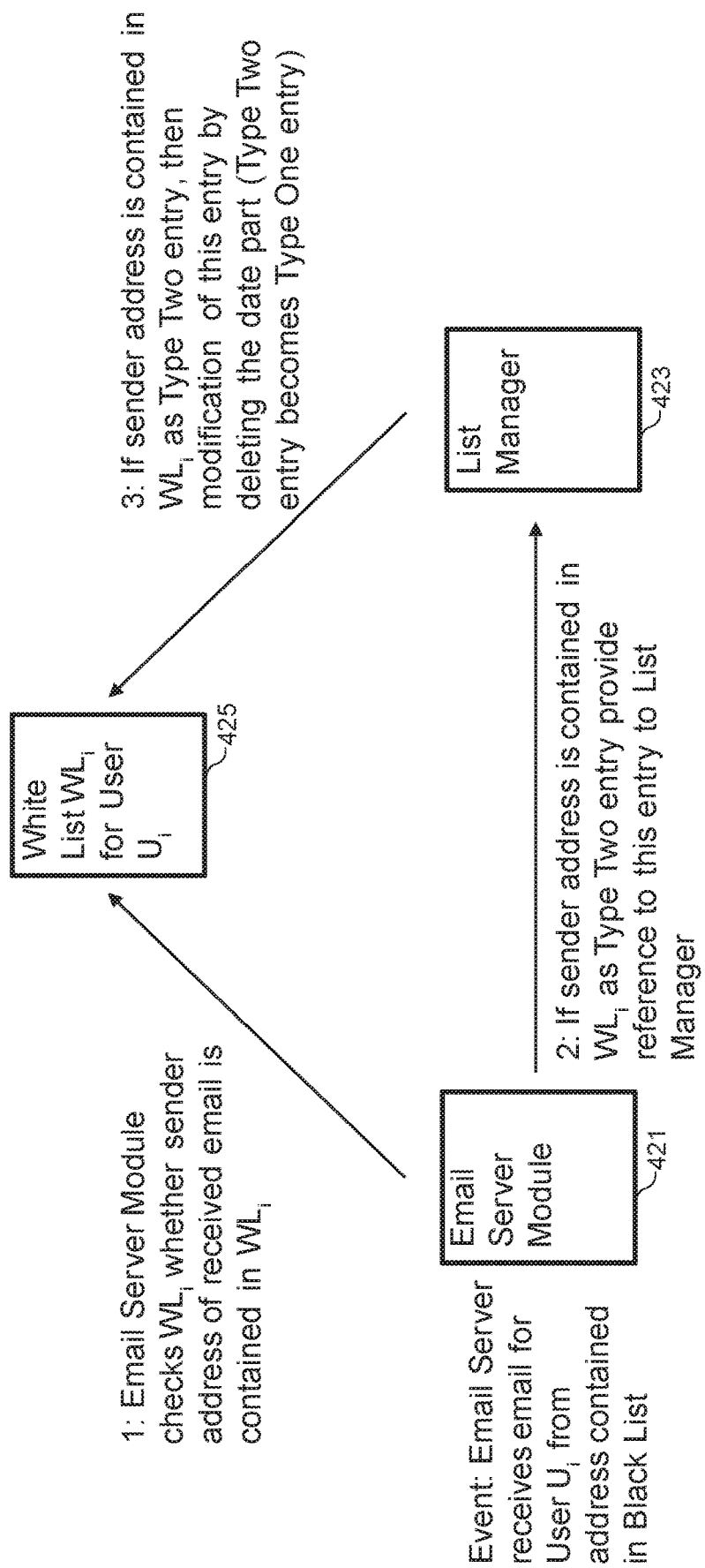
FIG. 4d shows a schematic diagram of a concept for a modification of a white list entry after reception of legitimate email according to an embodiment.

There may be also the case, in which user $U_i$ has registered at a web service and the first email from an address that matches to the address contained in the White List $WL_i$ arrives within a time interval smaller than D. In this case of the invention, the List Manager may modify the corresponding entry and it will not delete it. This case may be depicted in FIG. 4d. FIG. 4d shows a schematic diagram of a concept for a modification of a white list entry after reception of legitimate email according to an embodiment.

The reception of emails for all users may be controlled by the Email Server Module 421. The Email Server Module 421 may then check whether the sender address of a received email matches to an entry of the Black List. If there may be no match with a Black List entry, there may be no need for entry modification. Thus, for the following it may be assumed that the Email Server Module detects that the sender address of an email received by $U_i$ matches to a Black List entry. In this case, the Email Server Module may check whether the sender address of the email matches to an entry within White List $WL_i$ 425. For these checks, the Email Server Module may check against Type One entries and Type Two entries in $WL_i$. If the Email Server Module finds a match with a Type One entry, then no modification may be necessary. However, if the Email Server Module finds a match with a Type Two entry, e.g., (address$_{ij}$, date$_{ij}$), then the Email Server Module may provide the List Manager 423 with a reference to this entry and request the List Manager to modify the entry. Then the entry modification performed by the List Manager may be such that it deletes the date part date$_{ij}$ from the entry that only address$_{ij}$ remains as entry and the Type Two entry becomes a Type One entry in $WL_i$.

Figure 4E:
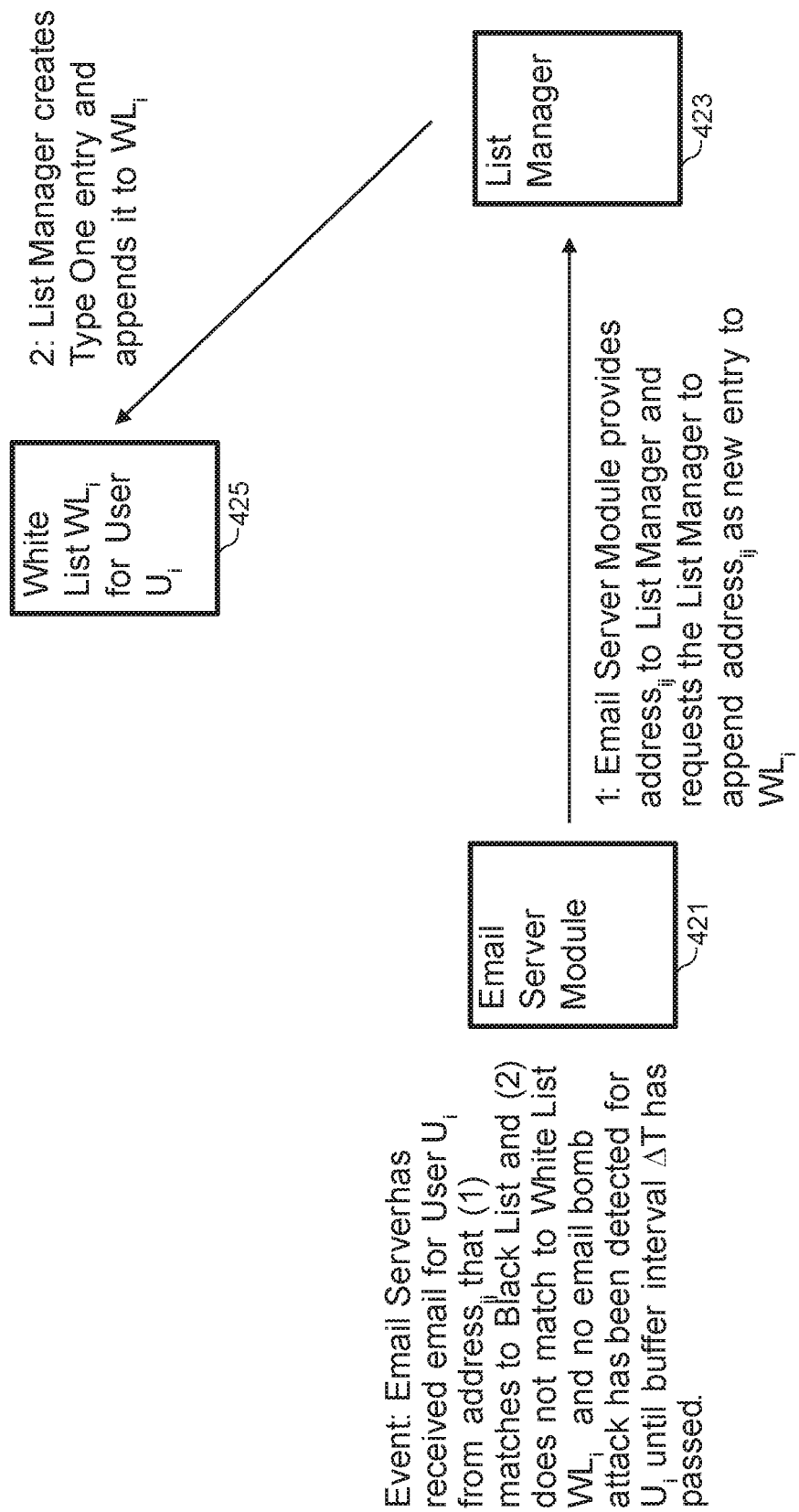
FIG. 4e shows a schematic diagram of a concept for an update of a white list, wherein the update is based on appending a new entry if no email bomb attack occurs according to an embodiment.

Updating White List with New Entries if no Email Bomb Attack Occurs: There may be the case in which the Email Server receives an email for user $U_i$, the email sender address matches to the Black List, the email sender address does not match to White List $WL_i$, the email account of user $U_i$ has not been attacked with an email bomb so far and the received email may be not part of an email bomb attack. This means that after the received email has been buffered for a time interval ΔT no email bomb attack may have been detected by the invention. In this case the received email may be considered to be not suspicious, and thus, the sender address may be appended to White List $WL_i$ (e.g. by adding 160 one of more electronic message sender identifiers of the subset of electronic messages to a plurality of unsuspicious electronic message sender identifiers if the number of electronic messages of the subset of electronic messages obtained within the pre-defined time interval is at most the number defined by the threshold). For this purpose, the Email Server Module may provide the List Manager with the sender address address$_{ij}$ and may request the List Manager to create a new Type One entry address$_{ij}$ to $WL_i$. FIG. 4e shows a schematic diagram of such a concept for an update of a white list, wherein the update is based on appending a new entry if no email bomb attack occurs according to an embodiment.

Detection of Email Bomb Attacks and Handling Emails if no such Attack Occurs: At least some embodiments implement the core logic of the mechanism for the detection of email bomb attacks in the Email Server Module. For this purpose, the Email Server Module may interact with other components of the invention as introduced above. The core logic of the mechanism may be shown in FIG. 4f.

Figure 4F:
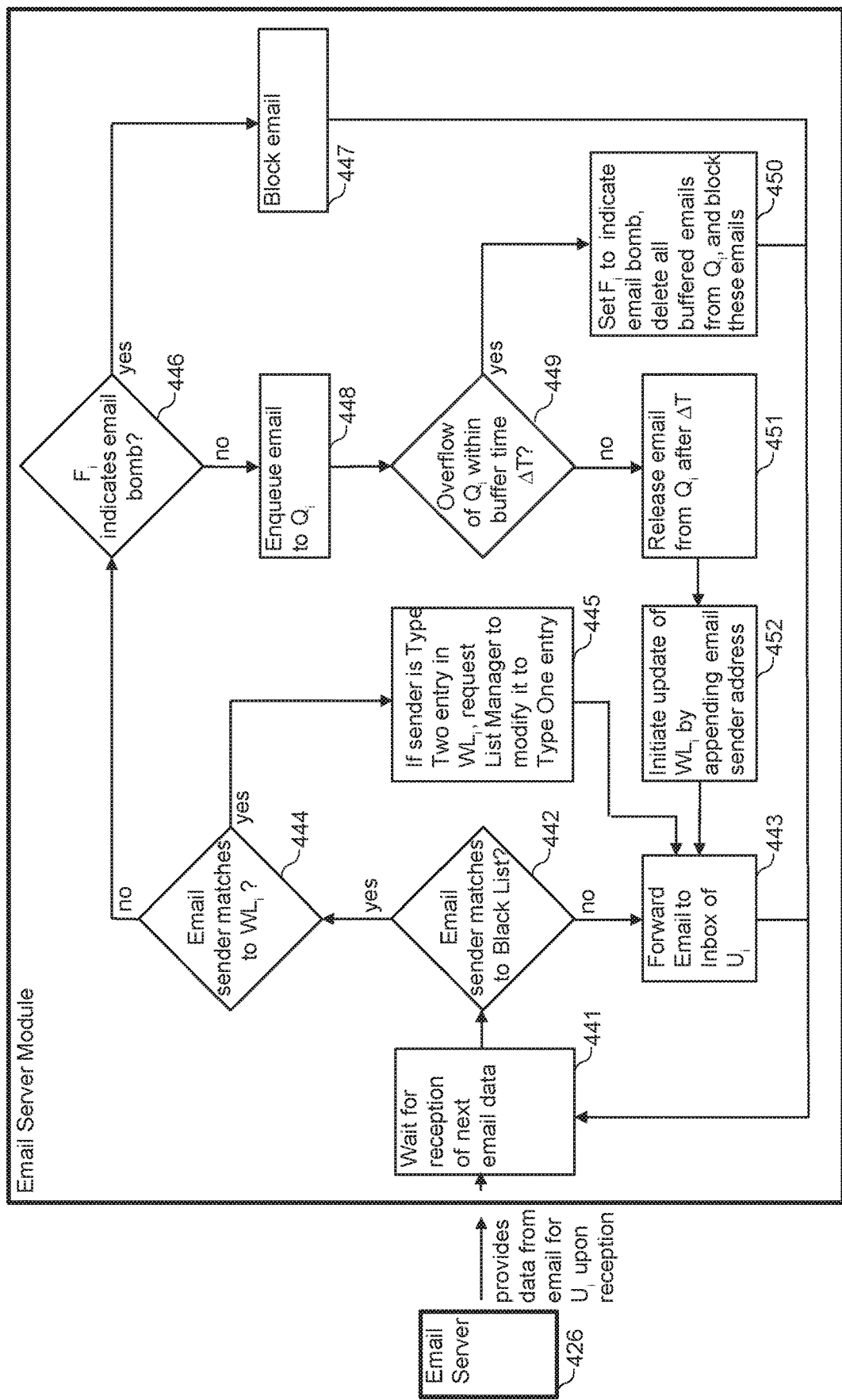
FIG. 4f shows a schematic diagram of a logic implemented in an e-mail server module according to an embodiment.

FIG. 4f shows a schematic diagram of a logic implemented in an e-mail server module according to an embodiment. The Email Server 426 may provide data from email for user $U_i$ to the Email Server Module 421. For the detection of email bomb attacks for emails received by user $U_i$ the Email Server Module may use a user-specific queue $Q_i$, in which the received emails may be buffered for a buffer time ΔT. Each email that is buffered in $Q_i$, might only be released after buffer time ΔT, not earlier. In the invention, the queue may be configured such that it might not buffer more than L emails. In an embodiment of the invention, the value for ΔT may be 3 minutes and the buffer limit L may be set to 10 emails. For user $U_i$, only the emails being suspicious for email bomb attacks might be buffered in $Q_i$, for buffer time ΔT as far as no email bomb attack has been detected. Note that suspicious means here that the email sender address matches to a Black List entry and it does not match to an entry in $WL_i$. The queue limitation in space and time may implement a time-based trap. Exceeding the space limit L with incoming suspicious emails may spring the trap. Then, all emails buffered in the queue may be deleted from the queue and an email bomb attack may be indicated with the user-specific flag $F_i$. If the flag $F_i$ indicates an email bomb attack, then the trap may be kept locked. If an email bomb attack has been detected, all further emails for user $U_i$ whose senders match to the Black List and not to the White List $WL_i$ may be immediately blocked in at least some embodiments.

When an email for user $U_i$ is received 441, then the Email Server Module 421 may first check 442 whether the sender may be in the Black List; if not, the email may be forwarded 443 to the inbox of user $U_i$. If yes, then the email may be analyzed 444 whether the email sender address matches to the user's $U_i$ personal White List $WL_i$; if yes, the email may be forwarded 443 to the inbox of $U_i$, but before, the Email Server Module requests 445 the List Manager to modify the corresponding entry in $WL_i$ from Type Two entry to Type One entry, if applicable. If the email sender does not match to the entries in $WL_i$, the Email Server Module logic may check 446 whether the time-based trap may be locked, i.e., whether this may be indicated by flag $F_i$; if yes, the email may be immediately blocked 447 for delivery. In some embodiments, blocked emails may be moved to a specific storage area. Alternatively or additionally (after some time), the emails may be deleted after blocking. If the time-based trap is not locked, then it may be inserted (enqueued) 448 in the queue $Q_i$, and may remain there for the buffer time $\Delta T$, unless an attack may be detected earlier. An overflow 449 of the limit L in the queue $Q_i$, respecting the buffer time $\Delta T$ springs 450 the time-based trap; this may cause deletion of (all) emails in queue $Q_i$, $F_i$ may be set to indicate an email bomb and the mails may be blocked. If a suspicious email survives the queue without overflowing queue $Q_i$, the email may be released 451 after buffer time $\Delta T$ from the queue $Q_i$, its sender address may be added 452 to the (updated) White List $WL_i$ and the email may be forwarded 443 to receiver's inbox. After execution of the logic, the logic may wait for reception of next email data 441.

More details and aspects of embodiments are mentioned in connection with the proposed concept or one or more examples described above (e.g. FIG. 1*a* to 3). Embodiments may comprise one or more additional optional features corresponding to one or more aspects of the proposed concept or one or more examples described above or below.

The aspects and features mentioned and described together with one or more of the previously detailed examples, embodiments and figures, may as well be combined with one or more of the other examples or embodiments in order to replace a like feature of the other example or in order to additionally introduce the feature to the other example.

Embodiments further provide a number of examples, which are based on the previously introduced embodiments.

Example 1 relates to method and/or apparatus for detecting email bomb attacks in a plurality of received emails and protection against such attacks. The method comprises one or more elements of the following components:

an Email Server Module that detects whether a received email is suspicious to be a part of an email bomb attack if the sender address matches to the email-bomb-related Black List and if the sender address does not match to the email-bomb-related and recipient-specific White List, an Email Server Module that forwards emails to the recipients inbox if the sender address does not match to the Black List, a List Manager that automatically controls, modifies and deletes the entries of recipient-specific White Lists, a Web Browsing Observer that collects information about addresses of web services such as URL accessed by a user as email recipient and provides this information and the information about the access date for the creation of new entries in the recipient-specific White List, an Email Server Module that initiates a modification in the recipient-specific White List that an email has been received from a sender address that matches to an entry in this White List that has been inserted to the White List upon data extraction of the Web Browsing Observer, a List Manager that automatically modifies the recipient-specific White List when no email has been received from a sender address within a given time interval D where the sender address has been inserted to the White List upon data extraction of the Web Browsing Observer, an Email Server Module enqueues received suspicious emails for a fixed buffer time in a recipient-specific queue with a given limitation in the number of emails that can be buffered and the buffer time each email remains in the queue, an Email Server Module that controls whether the buffer limitation of the recipient-specific queue is exceeded, an Email Server Module releases suspicious emails from the queue after buffering them for a buffer time interval to the recipients inbox unless the recipient-specific queue limit is exceeded, an Email Server Module that creates an entry to the recipient-specific White List for an email sender address after the email received from this sender has been released from the recipient-specific queue without exceeding the queue limit, when the number of emails exceeds the queue limit an email bomb attack is identified, the queued emails are blocked, and future emails will be blocked if their sender address matches to the Black List and if their sender address does not match to the recipient-specific White List, an Email Server Module having a recipient-specific flag that indicates that an email bomb attack has occurred for this recipient.

In Example 2, the method or apparatus according to Example 1 or according to any other Example may further include, that the modification initiated by the Email Server Module in the recipient-specific White List that an email has been received from a sender address that matches to an entry in this White List that has been inserted to the White List upon data extraction of the Web Browsing Observer is implemented as deletion of the date at which the web service has been accessed by the user.

In Example 3, the method or apparatus according to Example 1 or according to any other Example may further include, that the modification by the List Manager in the recipient-specific White List when no email has been received from a sender address within a given time interval where the sender address has been inserted to the White List upon data extraction of the Web Browsing Observer is implemented as deletion of the entry from the White List.

In Example 4, the method or apparatus according to one of the Examples 1 to 3 or according to any other Example may further include, that the Email Server Module is an extension to the Email Server.

In Example 5 the method or apparatus according to one of the Examples 1 to 4 or according to any other Example may further include, that the List Manager is implemented on the server side or on the user side or as cooperation components on the server side and on the user side.

In Example 6, the method or apparatus according to one of the Examples 1 to 5 or according to any other Example may further include, that the List Manager on the server side is implemented as an extension to the Email Server and the List Manager on the user side is implemented as an extension to the Email Client.

In Example 7, the method or apparatus according to one of the Examples 1 to 6 or according to any other Example may further include, that the Web Browsing Observer is implemented on the server side or on the user side or as cooperation components on the server side and on the user side.

In Example 8, the method or apparatus according to Example 6 or according to any other Example may further include, that the server side Web Browsing Observer is an extension to the Web Proxy and the user side Web Browsing Observer is an extension to the Web Browser.

In Example 9, the method or apparatus according to one of the Examples 1 to 8 or according to any other Example may further include, that an Email Server Module, Web Browsing Observer, and a List Manager provide functions for configuring parameters such as queue limit L, period time P, length of validity period D for White List Type Two entries, recipient-specific flag $F_i$, and email buffer time $\Delta T$.

In Example 10, the method or apparatus according to one of the Examples 1 to 9 or according to any other Example may further include, that the buffer is organized not as a queue, but instead as different storage and data structures such as array, list, stack, heap.

In Example 11 the method or apparatus according to one of the Examples 1 to 10 or according to any other Example may further include, that the Black List and White Lists are implemented either as databases or files.

In Example 12, the method or apparatus according to one of the Examples 1 to 11 or according to any other Example may include a List Manager that provides functions for the configuration and modification of the Black List and White Lists by a technical administrator.

In Example 13, the method or apparatus according to one of the Examples 1 to 12 or according to any other Example may include a List Manager that allows the recipient to configure and modify his recipient-specific White List.

In Example 14, the method or apparatus according to one of the Examples 1 to 13 or according to any other Example may include a List Manager that controls access to the Black List and White Lists based on entity authentication with user credentials such as login name and password.

In Example 15, the method or apparatus according to one of the Examples 1 to 14 or according to any other Example may include a Black List that is applied for all recipient accounts on the Email Server.

In Example 16, the method or apparatus according to one of the Examples 1 to 15 or according to any other Example may include several Black Lists each applied for a specific subgroup of recipients on the Email Server.

In Example 17, the method or apparatus according to one of the Examples 1 to 16 or according to any other Example may include recipient-specific White Lists having entries that exclusively contain address-related data (Type One), or entries that contain address-related data and date-related data indicating when web services have been accessed (Type Two), having both types of entries.

In Example 18, the method or apparatus according to one of the Examples 1 to 17 or according to any other Example may include, that the List Manager creates a new entry in the recipient-specific White List for each web service access by the user or the List Manager modifies an existing entry in the recipient-specific White List for a web service access by replacing the old date with the new date of the current web service access.

In Example 19, the method or apparatus according to one of the Examples 1 to 18 or according to any other Example may include a List Manager that modifies with period time P the recipient-specific White List when no email has been received from a sender address within a given time interval D where the sender address has been inserted to the White List upon data extraction of the Web Browsing Observer.

In Example 20, the method or apparatus according to one of the Examples 1 to 18 or according to any other Example may include that the components are implemented as software.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. Method for processing a plurality of electronic messages, the method comprising:
   Obtaining the plurality of electronic messages;
   Selecting at least a subset of electronic messages of the plurality of electronic messages directed to a single recipient based on a list of a plurality of suspicious electronic message sender identifiers, wherein an electronic message is selected if a sender identifier of the electronic message is same as one of the plurality of suspicious electronic message sender identifiers in the list;
   Determining whether a number of electronic messages of the subset of electronic messages directed to the single recipient and obtained within a pre-defined time interval exceeds a threshold; and
   Discarding the electronic messages of the subset of electronic messages if the number of electronic messages of the subset of electronic messages directed to the single recipient and obtained within the pre-defined time interval exceeds the threshold.

2. The method according to claim 1, wherein the plurality of electronic messages are a plurality of e-mail messages.

3. The method according to claim 1, wherein the method comprises delivering the electronic messages of the subset of electronic messages if the number of electronic messages of the subset of electronic messages obtained within the pre-defined time interval is at most the number defined by the threshold.

4. The method according to claim 1, wherein an electronic message of the plurality of electronic messages is omitted from the subset of electronic messages if a plurality of unsuspicious electronic message sender identifiers comprises a sender identifier of the electronic message.

5. The method according to claim 4, wherein the method comprises adding one of more electronic message sender identifiers of the subset of electronic messages to a plurality of unsuspicious electronic message sender identifiers if the number of electronic messages of the subset of electronic messages obtained within the pre-defined time interval is at most the number defined by the threshold.

6. The method according to claim 4, wherein the plurality of unsuspicious electronic message sender identifiers comprises a first subset of unsuspicious electronic message sender identifiers that is based on previously obtained electronic messages, and a second subset of unsuspicious electronic message sender identifiers that is based on a web browsing history of a user associated with the electronic message recipient.

7. The method according to claim 6, wherein the method further comprises obtaining information related to the web browsing history of the user associated with the electronic message recipient, and determining at least a part of the plurality of unsuspicious electronic message sender identifiers based on the information related to the web browsing history of the user associated with the electronic message recipient, wherein the information related to the web browsing history are obtained from a web proxy server or from a web browser extension.

8. The method according to claim 4, wherein the plurality of unsuspicious electronic message sender identifiers constitutes a whitelist of unsuspicious electronic message sender identifiers, wherein the whitelist is specific to said electronic message recipient.

9. The method according to claim 1, wherein the method comprises delivering the electronic messages of the plurality of electronic messages that are omitted from the subset of electronic messages.

10. The method according to claim 1, wherein the method is executed by an apparatus of an e-mail server, and/or wherein the subset of electronic messages are electronic messages of e-mail notification services.

11. The method according to claim 1, wherein the pre-defined time interval is defined relative to a current time or relative to a time of an event.

12. The method according to claim 11, wherein the subset of electronic messages is continually updated based on the pre-defined time interval that is defined relative to the current time or relative to the time of the event.

13. A machine readable storage medium including program code, when executed, to cause a machine to perform a method for processing a plurality of electronic messages, the method comprising:
    Obtaining the plurality of electronic messages;
    Selecting at least a subset of electronic messages of the plurality of electronic messages directed to a single recipient and based on a list of a plurality of suspicious electronic message sender identifiers, wherein an electronic message is selected if a sender identifier of the electronic message is same as one of the plurality of suspicious electronic message sender identifiers in the list;
    Determining whether a number of electronic messages of the subset of electronic messages directed to the single recipient and obtained within a pre-defined time interval exceeds a threshold; and
    Discarding the electronic messages of the subset of electronic messages if the number of electronic messages of the subset of electronic messages directed to the single recipient and obtained within the pre-defined time interval exceeds the threshold.

* * * * *